(12) United States Patent
Morrison et al.

(10) Patent No.: US 12,353,494 B2
(45) Date of Patent: Jul. 8, 2025

(54) BUILDING AND DEPLOYING A TAG LIBRARY FOR WEB SITE ANALYTICS AND TESTING

(71) Applicant: Capital One Services, LLC, McLean, VA (US)

(72) Inventors: Mark Morrison, Plano, TX (US); Jason Vanderslice, Plano, TX (US); Jingjie Zhao, Allen, TX (US); Erol Unal, Allen, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/306,782

(22) Filed: Apr. 25, 2023

(65) Prior Publication Data

US 2024/0362289 A1 Oct. 31, 2024

(51) Int. Cl.
G06F 7/00 (2006.01)
G06F 16/00 (2019.01)
G06F 16/22 (2019.01)
G06F 16/2455 (2019.01)
G06F 16/955 (2019.01)

(52) U.S. Cl.
CPC ........ *G06F 16/955* (2019.01); *G06F 16/2282* (2019.01); *G06F 16/2456* (2019.01)

(58) Field of Classification Search
None
See application file for complete search history.

(56) References Cited

U.S. PATENT DOCUMENTS

| | | | |
|---|---|---|---|
| 2014/0089782 A1* | 3/2014 | Cook | G06F 16/957 715/234 |
| 2015/0363484 A1* | 12/2015 | Kamath | G06F 16/907 707/751 |
| 2016/0364771 A1 | 12/2016 | Nielsen et al. | |
| 2018/0075002 A1* | 3/2018 | Addepalli | G06F 40/117 |
| 2018/0121263 A9 | 5/2018 | Li et al. | |
| 2021/0192282 A1* | 6/2021 | Goodsitt | G06F 18/2413 |
| 2021/0382949 A1* | 12/2021 | Yastrebenetsky | G06F 21/577 |

FOREIGN PATENT DOCUMENTS

| | | |
|---|---|---|
| CN | 112000748 A | 11/2020 |
| EP | 1992006 B1 | 2/2018 |

* cited by examiner

*Primary Examiner* — Tuan A Pham
(74) *Attorney, Agent, or Firm* — Harrity & Harrity, LLP

(57) ABSTRACT

In some implementations, a tag library device may receive, from first user devices, an indication of a set of tags with a corresponding set of properties and a corresponding set of rules. The tag library device may build a data structure that stores the set of tags in association with the corresponding set of properties and the corresponding set of rules and may transmit the data structure to second user devices such that a portion of the set of tags are included in a web site published by the second user devices. The tag library device may receive, from a platform associated with the web site, an indication of a set of events associated with the web site. The tag library device may determine statistics based on the set of events and may transmit a report including the statistics to third user devices associated with analytics for the web site.

20 Claims, 14 Drawing Sheets

| Experience | Experience Leader Name | Team Name | Team Lead Name | Product Name | Tag ID | Feature Name | Tag Name | Tag Description | Dynamic indicator | Action | Element Type | App ID Rule | Value Rule | Dealer ID Rule | VIN Rule |
|---|---|---|---|---|---|---|---|---|---|---|---|---|---|---|---|
| Offer | Randy | T1 | Todd | Optional products | 1 | service contract | mfe view | views a service... | False | Null | htmlElement | False | False | True | True |
| | | | | | 2 | service contract | amount | enters "amount"... | False | Null | textinput | False | True | False | False |
| | | | | | 3 | service contract | amount | slides "amount"... | False | Null | slider | False | True | False | False |
| | | | | | 4 | service contract | add protection | clicks "update"... | False | Null | button | False | True | False | False |
| | | | | | 5 | service contract | cancel | clicks "cancel"... | False | Null | button | False | False | False | True |
| | | | | | 6 | gap | mfe view | Views a gap... | False | Null | htmlElement | False | False | True | False |
| | | | | | 7 | gap | amount | enters "amount"... | False | Null | textinput | False | True | False | False |
| | | | | | 8 | gap | amount | slides "amount"... | False | Null | slider | False | True | False | False |
| | | | | | 9 | gap | add protection | clicks "update"... | False | Null | button | False | True | False | False |
| | | | | | 10 | gap | cancel | clicks "cancel"... | False | Null | button | False | False | True | False |
| | | | | | 14 | service contract | mfe view | views a dynam... | True | Null | htmlElement | False | False | False | True |
| | | | | | 15 | service contract | view | clicks an unsel... | True | Null | dropdown | False | False | True | False |
| | | | | | 16 | service contract | edit | clicks an alread... | True | Null | dropdown | False | True | True | False |
| | | | | | 17 | service contract | brochure | clicks a brochu... | True | Null | link | False | True | True | False |
| | | | | | 18 | gap | video | clicks a video l... | True | Null | link | False | True | True | False |
| | | | | | 19 | gap | dynamic | makes a covera... | True | Null | dropdown | False | False | True | False |
| | | | | | 20 | gap | dynamic | makes an addit... | True | Null | checkbox | False | False | True | False |
| | | | | | 21 | gap | cancel | clicks "cancel"... | False | load | button | False | False | True | False |
| | | T2 | David | Retail platform | 1 | application personal | mfe view | land on PQ... | False | blur | htmlElement | False | False | False | False |
| | | | | | 2 | application personal | first name | enters "first na... | False | blur | textinput | False | False | False | False |
| | | | | | 3 | application personal | last name | enters "last na... | False | blur | textinput | False | False | False | False |
| | | | | | 4 | application personal | email | enters "email"... | False | blur | textinput | False | False | False | False |
| | | | | | 5 | application personal | confirm email | enters "confirm... | False | blur | textinput | False | False | False | False |
| | | | | | 6 | application personal | phone number | enters "phone n... | False | blur | textinput | False | False | False | False |
| | | | | | 7 | application personal | joint first name | enters "joint fir... | False | blur | textinput | False | False | False | False |
| | | | | | 8 | application personal | joint last name | enters "joint las... | False | blur | textinput | False | False | False | False |
| | | | | | 9 | application personal | joint email | enters "joint em... | False | blur | textinput | False | False | False | False |
| | | | | | 10 | application personal | joint confirm email | enters "joint co... | False | blur | textinput | False | False | False | False |

FIG. 4

BUILDING AND DEPLOYING A TAG LIBRARY FOR WEB SITE ANALYTICS AND TESTING

BACKGROUND

Web site tags (also referred to as "web tags") are pieces of functional code (usually small, such as only one line or a few lines long) that are embedded in code for a web page (whether for display via a web browser or for embedding in a mobile application). The tags typically record events as users navigate through a web site that includes the tags.

SUMMARY

Some implementations described herein relate to a system for using a tag library for determining web site quality. The system may include one or more memories and one or more processors communicatively coupled to the one or more memories. The one or more processors may be configured to receive, from one or more first user devices, an indication of a set of tags with a corresponding set of properties and a corresponding set of rules. The one or more processors may be configured to generate a corresponding set of identifiers for the set of tags. The one or more processors may be configured to build a data structure that stores the set of tags in association with the corresponding set of properties, the corresponding set of identifiers, and the corresponding set of rules. The one or more processors may be configured to transmit at least a portion of the data structure to one or more second user devices, wherein at least a portion of the set of tags are included in a web site published by the one or more second user devices. The one or more processors may be configured to receive, from a platform associated with the web site, an indication of a set of events associated with the web site. The one or more processors may be configured to verify the set of events against at least a portion of the corresponding set of rules for the portion of the set of tags included in the web site. The one or more processors may be configured to transmit a report associated with verifying the set of events to one or more third user devices associated with analytics for the web site.

Some implementations described herein relate to a method of using a tag library to enable web site reports. The method may include receiving, from one or more first user devices, an indication of a set of tags with a corresponding set of properties and a corresponding set of rules. The method may include building a data structure that stores the set of tags in association with the corresponding set of properties, the corresponding set of rules, and a corresponding set of identifiers generated for the set of tags. The method may include transmitting at least a portion of the data structure to one or more second user devices, wherein at least a portion of the set of tags are included in a web site published by the one or more second user devices. The method may include receiving, from a platform associated with the web site, an indication of a set of events associated with the web site. The method may include determining one or more statistics based on the set of events and associated with at least a portion of the corresponding set of identifiers for the portion of the set of tags included in the web site. The method may include transmitting a report including the one or more statistics to one or more third user devices associated with analytics for the web site.

Some implementations described herein relate to a non-transitory computer-readable medium that stores a set of instructions for using a tag library to simulate user interaction. The set of instructions, when executed by one or more processors of a device, may cause the device to receive a data structure that stores a set of tags in association with a corresponding set of properties, a corresponding set of identifiers, and a corresponding set of rules. The set of instructions, when executed by one or more processors of the device, may cause the device to receive an indication of dependencies between at least a portion of the set of tags. The set of instructions, when executed by one or more processors of the device, may cause the device to simulate a plurality of paths through a web site including the portion of the set of tags. The set of instructions, when executed by one or more processors of the device, may cause the device to receive an indication of a set of events associated with the plurality of paths. The set of instructions, when executed by one or more processors of the device, may cause the device to verify the set of events against at least a portion of the corresponding set of rules for the portion of the set of tags included in the web site. The set of instructions, when executed by one or more processors of the device, may cause the device to transmit a report associated with verifying the set of events.

BRIEF DESCRIPTION OF THE DRAWINGS

FIG. 4 is a diagram of an example data structure used as a tag library, in accordance with some embodiments of the present disclosure.

DETAILED DESCRIPTION

Figure 1A:
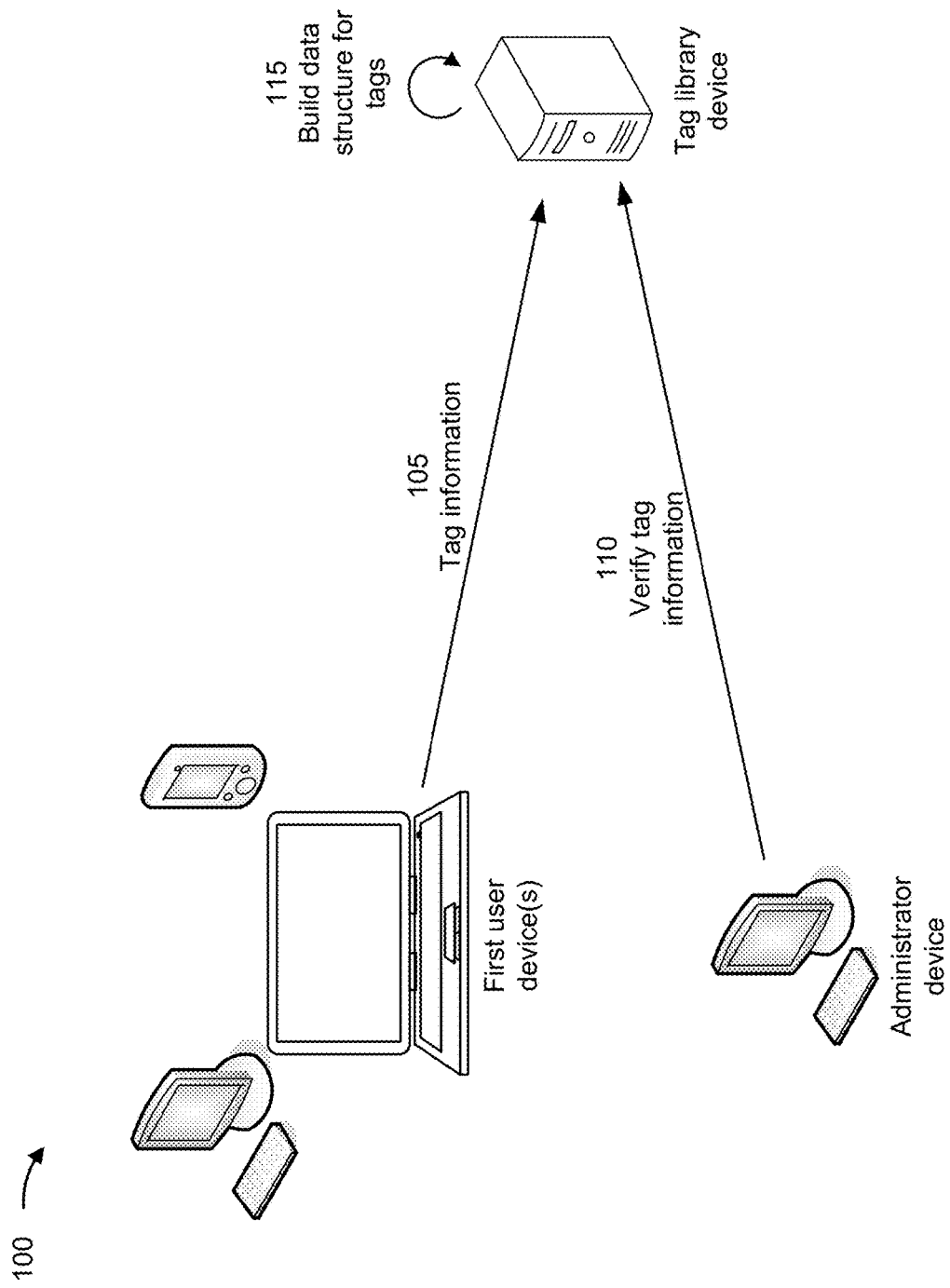
FIGS. 1A-1C are diagrams of an example implementation relating to building and deploying a tag library for quality reporting, in accordance with some embodiments of the present disclosure.

The following detailed description of example implementations refers to the accompanying drawings. The same reference numbers in different drawings may identify the same or similar elements.

Web site tags are often embedded in code for a web site (e.g., code for web pages of a web site). For example, developers may deploy tags that log events. As a result, developers may track problems with the web site based on the logged events. Additionally, or alternatively, an analytics team may use logged events to monitor traffic to, and interaction with, the web site. However, web site development is often spread across multiple teams, which means that each team's tags may be associated with different formats and rules than other teams' tags. In other words, tags typically can be debugged and corrected only by the corresponding team that deployed those tags.

Some implementations described herein enable crowdsourcing of a tag library storing a set of tags and a corresponding set of rules. As a result, the set of tags are associated with standardized formats and rules. Therefore, a report verifying events generated by the set of tags against the corresponding set of rules may be generated automatically, even when the set of tags are associated with multiple teams. Generating a single report conserves power, processing resources, and memory overhead as compared with generating multiple reports when each team's tags are different from other teams' tags. Furthermore, the report may be transmitted to different teams for debugging and correcting the set of tags because the tag library has standardized the formats and rules for the set of tags. As a result, latency between detecting errors and correcting errors may be reduced as compared with tags needing to be debugged and corrected only by the corresponding team that deployed the tags. Correcting errors sooner conserves power, processing resources, and memory overhead that would otherwise have been wasted in generating events that do not comply with the corresponding set of rules for the set of tags.

Also, because web site development is often spread across multiple teams, each team may deploy tags that are associated with identifiers chosen by the team. Therefore, event logs generated by the tags are traceable using the identifiers chosen by the team, which limits analytics from across teams because the teams are using different identifier formats. Similarly, testing of the web site is decentralized, which incurs additional processing costs and memory overhead to sort through event logs associated with disparate identifier formats.

Some implementations described herein enable a tag library to store a set of tags and a corresponding set of identifiers that are unique to each tag. As a result, analytics may be calculated for a web site regardless of how many developer teams worked on the web site because all event logs generated by the web site are identifiable using the corresponding set of identifiers in the tag library. Calculating analytics using the tag library as a single source of truth conserves power, processing resources, and memory overhead as compared with calculating analytics when each team's tags are associated with different identifier formats as compared with other teams' tags. Furthermore, testing of the web site may be centralized using the corresponding set of identifiers in the tag library, which conserves processing costs and memory as compared with sorting through event logs associated with disparate identifier formats.

Figure 1B:
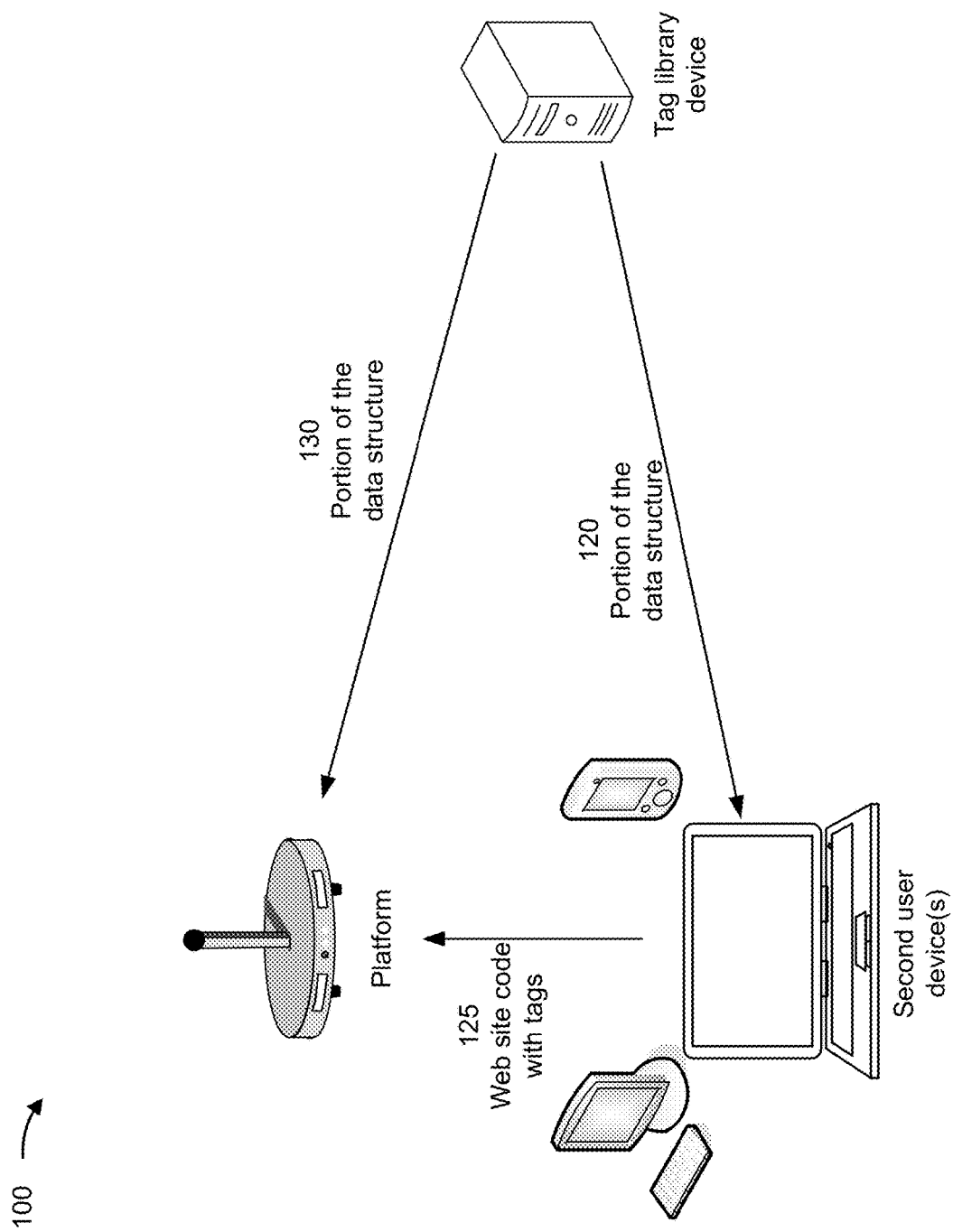
Figure 1C:
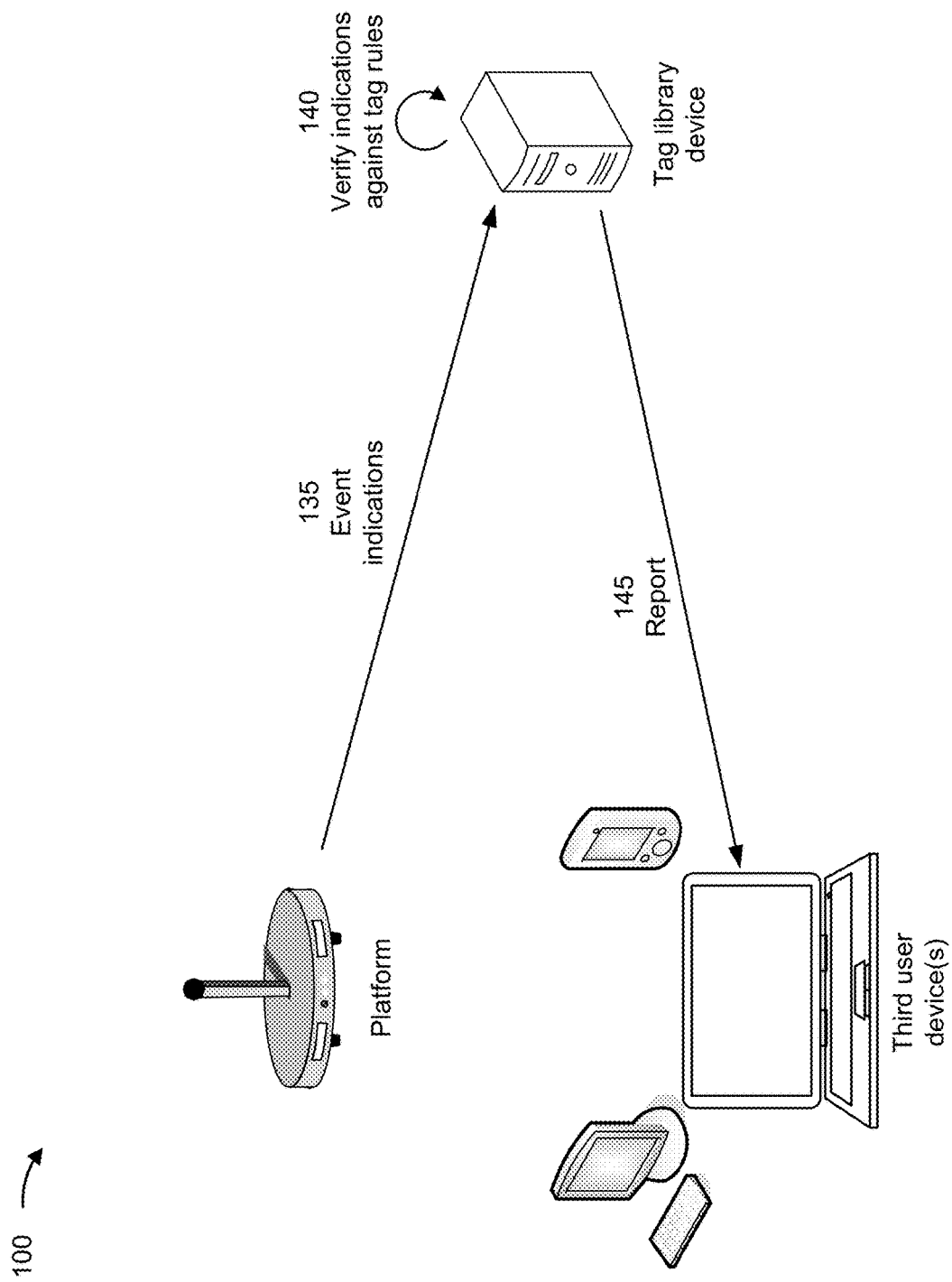

FIGS. 1A-1C are diagrams of an example 100 associated with building and deploying a tag library for quality reporting. As shown in FIGS. 1A-1C, example 100 includes one or more first user devices, a tag library device, an administrator device, one or more second user devices, a platform, and one or more third user devices. These devices are described in more detail in connection with FIGS. 7 and 8.

As shown in FIG. 1A by reference number 105, the first user device(s) may transmit, and the tag library device may receive, information associated with a set of tags. The information may be an indication of a set of tags with a corresponding set of properties and a corresponding set of rules. The indication may include code for each tag along with a name, a description, an element type, and/or another property associated with the tag. The indication may further include, for each tag, rules (e.g., one or more rules) to apply to output from the tag. Accordingly, the rules associated with the tag may be used to verify event data generated by the tag, as described in connection with reference number 140. The indication may be included in a hypertext transfer protocol (HTTP) message and/or provided as an argument to an application programming interface (API) call, among other examples.

In some implementations, the indication of the set of tags may be crowdsourced. For example, one of the first user devices may transmit code for a first subset, out of the set of tags, along with corresponding properties and rules for the first subset of tags. Furthermore, another of the first user devices may transmit code for a second subset, out of the set of tags, along with corresponding properties and rules for the second subset of tags. Although the example 100 is described using two first user devices, other examples may include additional first user devices. Therefore, the tag library device may collate the set of tags from multiple first user devices. The tag library device may, in some implementations, receive from different first user devices at different times such that the indication of the set of tags is compiled over time (sometimes referred to as "asynchronous collaboration").

The tag library device may verify the first user device(s) as a prerequisite to receiving the indication of the set of tags. For example, each first user device may transmit, and the tag library device may receive, a set of credentials associated with a user of the first user device. The set of credentials may include a username and password, a passcode, a secret answers, a certificate, a key, and/or biometric information, among other examples. In some implementations, the user may interact with a user interface (UI) (e.g., via a keyboard, a mouse, a touchscreen, or another type of input component) and trigger the first user device to transmit the set of credentials based on the interaction. For example, the user may instruct the first user device to navigate to a web site (e.g., via a web browser or another type of application) that is hosted by, or at least associated with, the tag library device, such that the user interacts with the website (e.g., via a keyboard, a mouse, a touchscreen, or another type of input component) to trigger the first user device to transmit the set of credentials. Accordingly, the tag library device may verify the set of credentials and allow the first user device to transmit to the tag library device based on verifying the set of credentials. For example, the tag library device may accept an HTTP message and/or an API call from the first user device.

In some implementations, as shown by reference number 110, the administrator device may transmit, and the tag library device may receive, a verification of the information associated with the set of tags. For example, a user of the administrator device may review the indication of the set of tags and verify that each tag is ready for inclusion in a library. In some implementations, the user may interact with a UI (e.g., via a keyboard, a mouse, a touchscreen, or another type of input component) and trigger the administrator device to transmit the verification based on the interaction. For example, the user may instruct the administrator device to navigate to a web site (e.g., via a web browser or another type of application) that is hosted by, or at least associated with, the tag library device, such that the user interacts with the website (e.g., via a keyboard, a mouse, a touchscreen, or another type of input component) to trigger the administrator device to transmit the verification. In some implementations, the tag library device may verify a set of credentials associated with the user of the administrator device (e.g., similarly as described above) as a prerequisite to providing the indication of the set of tags for verification.

For any tag indicated as not ready for inclusion in a library by the user of the administrator device, the tag library device may transmit an indication of rejection to a corresponding first user device that provided the tag. Accordingly, a user of the corresponding first user device may re-submit information associated with the tag to be reviewed again by the user of the administrator device.

As shown by reference number 115, the tag library device may build a data structure that stores the set of tags in association with the corresponding set of properties and the corresponding set of rules. For example, the data structure may include a tabular database or another type of relational database (e.g., using structured query language (SQL)). In some implementations, as described in connection with FIG. 4, the data structure may be organized by rows, where each row corresponds to a different tag in the set of tags. Alternatively, the data structure may include a NoSQL database. The data structure may be referred to as a "tag library" or a "tag catalog."

In some implementations, the tag library device may generate a corresponding set of identifiers, for the set of tags, to store in association with the set of tags in the data structure. For example, the tag library device may generate, for each tag in the set of tags, a unique alphanumeric identifier for including in the set of identifiers. The tag library device may generate each identifier randomly (or pseudo-randomly) or may assign identifiers in a sequential order (e.g., increasing numerically and/or increasing alphabetically, among other examples). Additionally, in some implementations, the tag library device may combine information (e.g., a numerical index and a name) to generate the identifiers. Therefore, each tag is associated with a unique identifier in the data structure, regardless of which first user device provided the tag.

As shown in FIG. 1B and by reference number 120, the tag library device may transmit, and the second user device(s) may receive, (at least) a portion of the data structure. The portion of the data structure may be included in an HTTP message and/or provided as a return from an API call, among other examples.

In some implementations, the tag library device may transmit the portion of the data structure in response to a request. A user of each second user device may interact with a UI (e.g., via a keyboard, a mouse, a touchscreen, or another type of input component) and trigger the second user device to transmit the request based on the interaction. For example, the user may instruct the second user device to navigate to a web site (e.g., via a web browser or another type of application) that is hosted by, or at least associated with, the tag library device, such that the user interacts with the website (e.g., via a keyboard, a mouse, a touchscreen, or another type of input component) to trigger the second user device to transmit the request. In some implementations, the tag library device may verify a set of credentials associated with the user of the second user device (e.g., similarly as described above) as a prerequisite to providing the portion of the data structure.

The second user device(s) may be associated with developer accounts. Accordingly, (at least) a portion of the set of tags are to be included in a web site published by the second user device(s). For example, the second user device(s) may incorporate code for the portion of the set of tags (e.g., provided in the portion of the data structure received by the second user device(s)) into code for the web site. The code for the web site may include hypertext markup language (HTML), cascading style sheets (CSS), JavaScript®, and/or similar code. The user(s) of the second user device(s) may interact with a UI (e.g., via a keyboard, a mouse, a touchscreen, or another type of input component) to incorporate the code for the portion of the set of tags into the code for the web site.

Accordingly, as shown by reference number 125, the second user device(s) may transmit, and the platform may receive, the code for the web site that incorporates the portion of the set of tags. Therefore, the platform may publish the web site for public consumption, such as through the Internet (or quasi-public consumption, such as through an intranet). The platform may host the web site directly or may instruct an external hosting device to allow access to the web site.

The tag library device may also transmit the portion of the data structure to the platform, as shown by reference number 130. For example, the platform may include an analytics engine that receives event information generated by the portion of the set of tags incorporated in the web site. Other examples may include an external analytics engine that receives the event information from the platform (or from an external hosting device controlled by the platform, as described above). Accordingly, the tag library device may additionally, or alternatively, transmit the portion of the data structure to the external analytics engine.

Additionally, or alternatively, the second user device(s) may reference the portion of the set of tags (e.g., via a portion of the corresponding set of identifiers) rather than include the portion of the set of tags directly in the code for the web site. Therefore, the platform may request (e.g., via an HTTP message and/or an API call) code for the portion of the set of tags during runtime, and the tag library device may transmit (from the data structure) the code for the portion of the set of tags to the platform. As a result, code for tags may be updated without modifying the code for the web site directly.

As shown in FIG. 1C and by reference number 135, the platform may transmit, and the tag library device may receive, an indication of a set of events associated with the web site. Each event may include a corresponding identifier for the tag that recorded the event along with a datetime, an Internet protocol (IP) address, a medium access control (MAC) address, and/or another piece of information recorded by the tag. Interaction with an element of the web site may trigger the tag to record the event based on the interaction. Accordingly, the event may further indicate a type of interaction (e.g., a mouse click, data entry via typing, or a scroll, among other examples). The indication may be included in an HTTP message and/or provided as return from an API call, among other examples.

The tag library device may collate the set of events from the platform over time. For example, the platform may stream events to the tag library device such that the indication of the set of events is compiled over time. The platform may stream in real-time (e.g., transmitting each event within one or two seconds after the event is generated by the tag) or in quasi-real-time (e.g., sending periodic batches of events to the tag library device). In some implementations, the tag library device may subscribe to event updates from the platform (e.g., using an HTTP message and/or an API call).

As shown by reference number 140, the tag library device may verify the set of events against (at least) a portion of the corresponding set of rules for the portion of the set of tags included in the web site. Example rules include a rule that the event should include a particular piece of information (e.g., an application identity (ID) or a page title, among other examples) or a rule associated with quality of information (e.g., that a datetime included in an event for one tag should be after a datetime included in a corresponding event for another tag), among other examples. The tag library device may generate Booleans (or another type of bit) for each rule applied to each event that indicates whether the event complies with the rule (e.g., using a value of 'TRUE' or '1').

As shown by reference number 145, the tag library device may transmit, and the third user device(s) may receive, a report associated with verifying the set of events. For example, the tag library device may generate a table in a spreadsheet, a portable document format (pdf) file, or another type of document that indicates the Booleans generated during verification.

In some implementations, the report may indicate a portion, of the set of events, that comply with each rule in the corresponding set of rules. For example, as described in connection with FIG. 5, the report may indicate a percentage of events, generated by each tag, that comply with the rules corresponding to the tag. In some implementations, the report may be color-coded or otherwise visually indicate the portion in addition to, or in lieu of, text. For example, higher percentages may indicate greater compliance and thus be indicated using green or another similar color while lower percentages may indicate less compliance and thus be indicated using red or another similar color.

The third user device(s) may be associated with analytics for the web site. Therefore, the third user device(s) may request debugging and correction from developers associated with tags that are generating events that do not comply with the rules. Additionally, or alternatively, the third user device(s) may include the second user device(s) such that the developers are notified directly of which tags do not comply with the rules.

By using techniques as described in connection with FIGS. 1A-1C, the tag library device generates the data structure storing the set of tags and the corresponding set of rules. Therefore, the tag library device automatically generates the report based on verifying events, generated by the portion of the set of tags, against the portion of the corresponding set of rules, which conserves power, processing resources, and memory overhead as compared with generating multiple reports, at least one report per team that contributed to the web site. Furthermore, the report may be transmitted to additional user devices for debugging and correction, not only the second user device(s). As a result, latency between detecting errors and correcting errors may be reduced as compared with tags needing to be debugged and corrected only by a corresponding team that contributed the tags to the web site. Correcting errors sooner conserves power, processing resources, and memory overhead that would otherwise have been wasted when the tags generate events that do not comply with the corresponding set of rules.

As indicated above, FIGS. 1A-1C are provided as an example. Other examples may differ from what is described with regard to FIGS. 1A-1C.

Figure 2A:
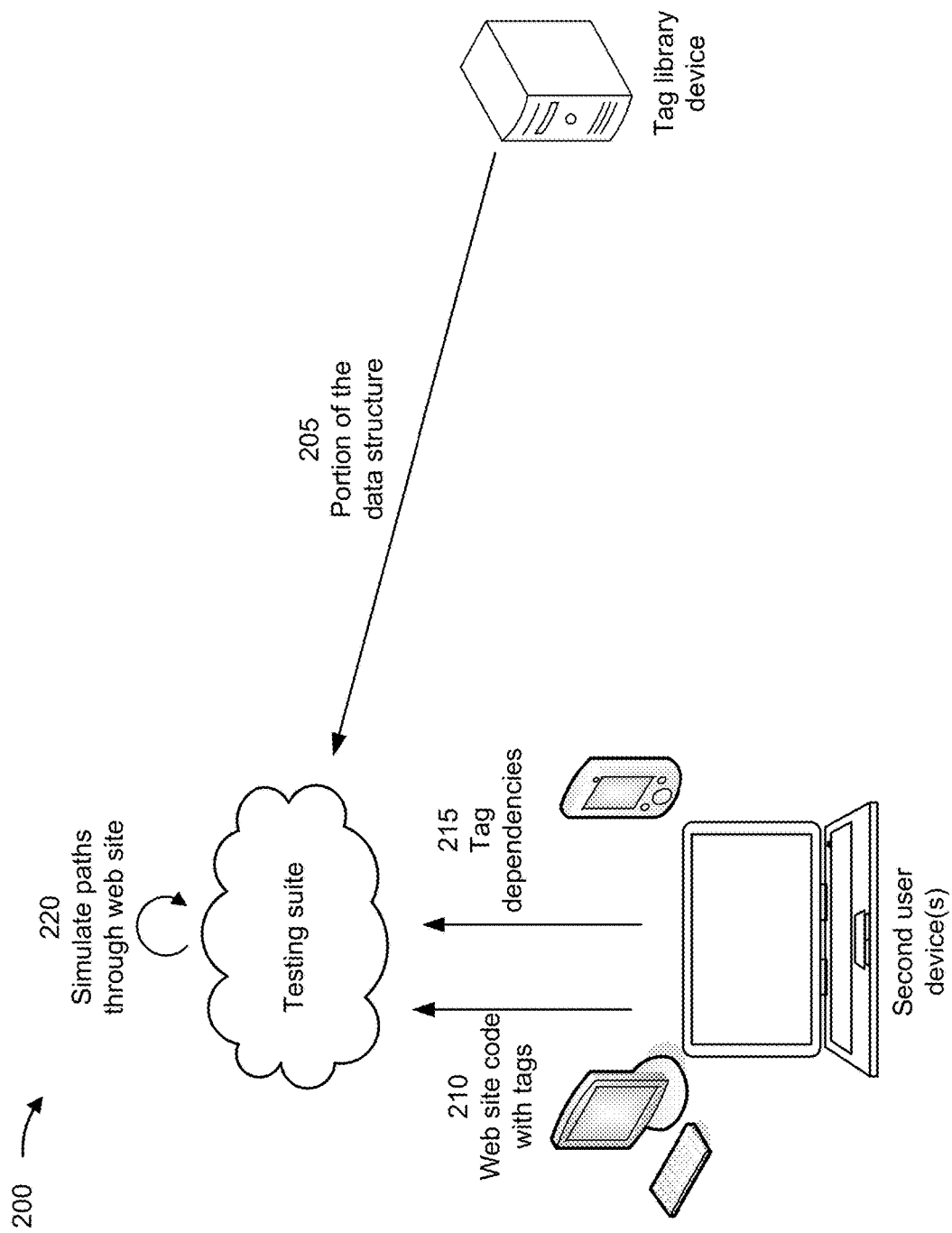
FIGS. 2A-2C are diagrams of an example implementation relating to building and deploying a tag library for web site testing, in accordance with some embodiments of the present disclosure.
Figure 2B:
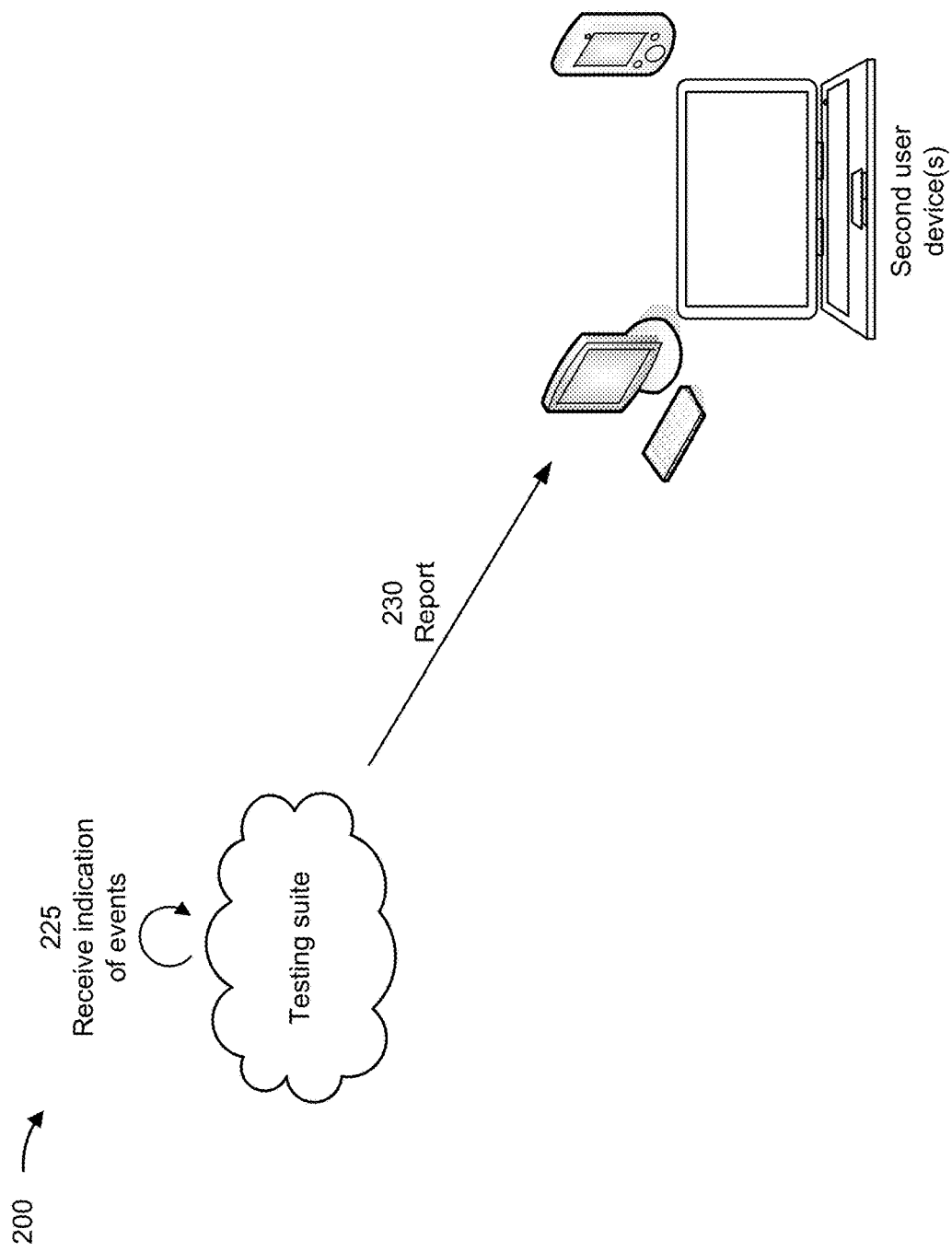
Figure 2C:
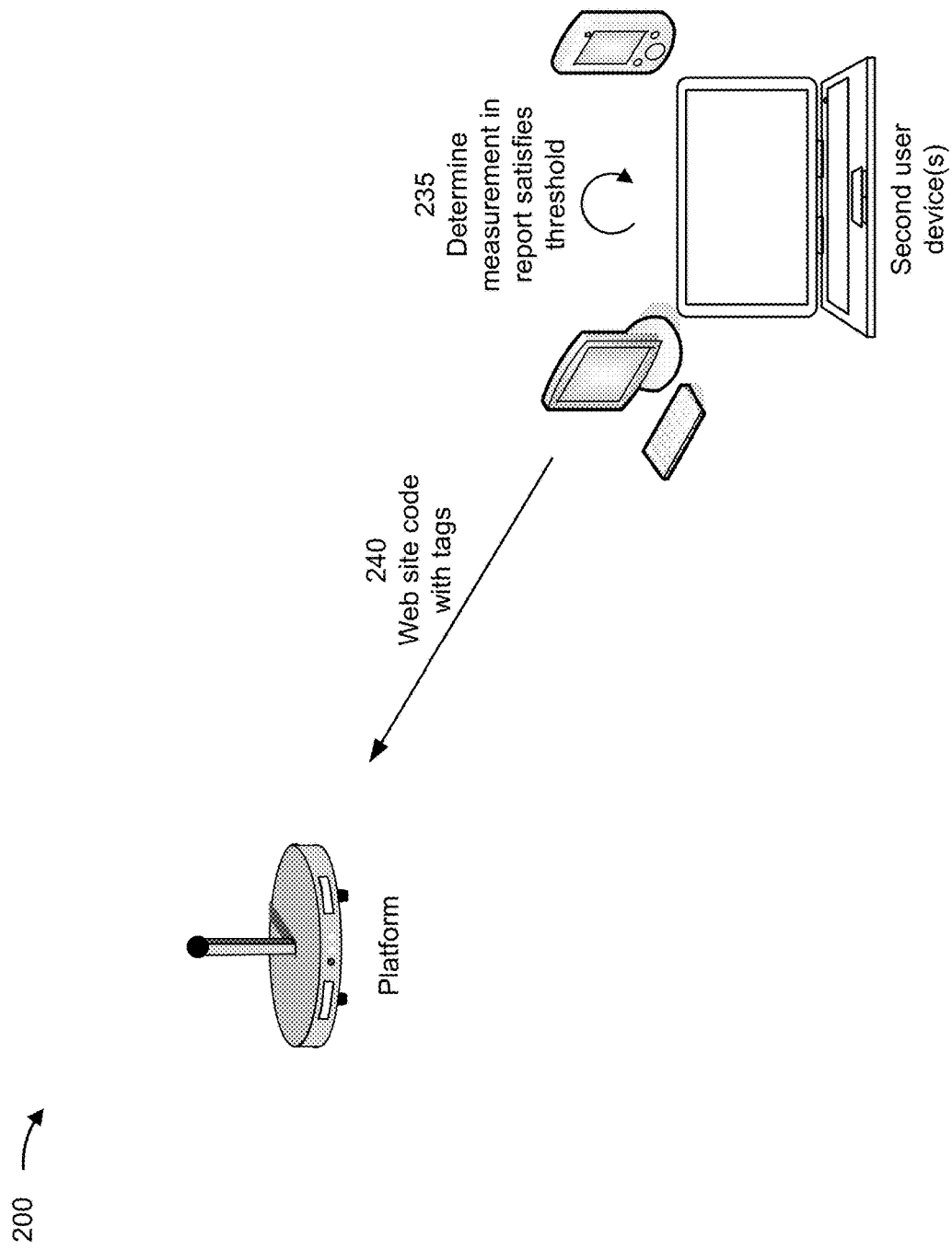

FIGS. 2A-2C are diagrams of an example 200 associated with building and deploying a tag library for web site testing. As shown in FIGS. 2A-2C, example 200 includes a tag library device, one or more second user devices, a testing environment, and a platform. These devices are described in more detail in connection with FIGS. 7 and 8.

In the example 200, the tag library device may have built a data structure as described in connection with FIG. 1A. For example, the tag library device may have crowdsourced a set of tags, with a corresponding set of rules and a corresponding set of properties, from first user device(s). Additionally, the tag library device may have generate a corresponding set of identifiers for the set of tags. Therefore, the tag library device may receive the data structure from a local storage (e.g., a memory managed by the tag library device) and/or from a storage that is at least partially external (e.g., logically, physically, and/or virtually) to the tag library device. Therefore, the tag library device may transmit a query to an external database (e.g., included in an HTTP request and/or using an API call) and receive a response to the query (e.g., included in an HTTP response and/or as a return from the API call) that includes the data structure.

As shown in FIG. 2A and by reference number 205, the tag library device may transmit, and the testing environment may receive, (at least) a portion of the data structure. For example, the testing environment may include a sandbox environment that simulates interaction with a web site. In some implementations, the testing environment may transmit a request for the portion of the data structure to the tag library device. Additionally, or alternatively, at least one second user device may transmit a request for the tag library device to provide the portion of the data structure to the testing environment. The tag library device may verify a set of credentials associated with the testing environment and/or a set of credentials associated with a user of the at least one second user device (e.g., similarly as described above) as a prerequisite to providing the portion of the data structure.

As shown by reference number 210, the second user device(s) may transmit, and the testing environment may receive, code for a web site that incorporates (at least) a portion of the set of tags. Therefore, the testing environment may allow for testing the code before publishing the web site (e.g., using the platform, as described in connection with reference number 240).

Additionally, as shown by reference number 215, the second user device(s) may transmit, and the testing environment may receive, an indication of dependencies between the portion of the set of tags. For example, the second user device(s) may provide a dependency tree (or another type of relational structure) that depicts how some tags depend (logically, spatially, and/or temporally) on other tags.

As shown by reference number 220, the testing environment may simulate a plurality of paths through the web site. For example, the testing environment may generate artificial indications of interactions (e.g., mouse clicks, scrolls, and data entries, among other examples) with elements of the web site. The plurality of paths may be indicated by the second user device(s) and/or may be determined by the testing environment (e.g., using a pathfinding algorithm).

Because the web site incorporates the portion of the set of tags, the simulation results in a set of events generated by the portion of the set of tags. Therefore, as shown in FIG. 2B and by reference number 225, the testing environment may receive an indication of the set of events associated with the plurality of paths. Each event may include a corresponding identifier for the tag that recorded the event along with a datetime, an IP address, a MAC address, and/or another piece of information recorded by the tag. Simulated interaction with an element of the web site may trigger the tag to record the event based on the interaction. Accordingly, the event may further indicate a type of simulated interaction (e.g., a mouse click, data entry via typing, or a scroll, among other examples).

The testing environment may collate the set of events from the tags over time. For example, events may be streamed events to the testing environment such that the indication of the set of events is compiled over time. The events may be streamed in real-time (e.g., each event is received within one or two seconds after the event is generated by the tag) or in quasi-real-time (e.g., events are cached and delivered to the testing environment in periodic batches).

The testing environment may verify the set of events against (at least) a portion of the corresponding set of rules for the portion of the set of tags included in the web site. The testing environment may generate Booleans (or another type of bit) for each rule applied to each event that indicates whether the event complies with the rule (e.g., using a value of 'TRUE' or '1').

As shown by reference number 230, the testing environment may transmit, and the second user device(s) may receive, a report associated with verifying the set of events. For example, the testing environment may generate a table in a spreadsheet, a pdf file, or another type of document that indicates the Booleans generated during verification.

Because each tag is associated with a unique identifier in the data structure, as described in connection with FIG. 1A, the testing environment may generate a single report for all tags by using the data structure as a single source of truth. For example, the data structure includes identifiers for all tags included in the web site such that the testing environment may map all events received based on the simulation to corresponding rules and generate a single report based on applying the corresponding rules. The testing environment therefore conserves a significant amount of power, processing resources, and memory overhead as compared with mapping events received based on the simulation to multiple sources of truth (e.g., using different tag identifier formats from different teams that contributed to the web site). Indeed, in some scenarios, the testing environment may have otherwise had to repeat simulations when events, associated with different tags, were indistinguishable because the different tags were independently assigned a same identifier by different teams, which would have wasted even more power, processing resources, and memory overhead.

As shown by reference number 235, the second user device(s) may determine that a measurement in the report satisfies a publication threshold. For example, the measurement may include a percentage of events, generated by each tag, that comply with the rules corresponding to the tag. Therefore, the publication threshold may be a percentage of events that must be compliant before publishing the web site. Additionally, or alternatively, the measurement may include a percentage of tags, included in the web site, that were triggered by the simulation. Therefore, the publication threshold may be a percentage of tags that must be tested before publishing the web site.

Therefore, as shown by reference number 240, the second user device(s) may transmit, and the platform may receive, the code for the web site that incorporates the portion of the set of tags. In some implementations, the second user device(s) may transmit the code for publication automatically (e.g., in response to determining that the measurement satisfies the publication threshold). Additionally, or alternatively, a user of at least one second user device may trigger transmittal of the code for publication. The platform may publish the web site for public consumption, such as through the Internet (or quasi-public consumption, such as through an intranet). The platform may host the web site directly or may instruct an external hosting device to allow access to the web site.

By using techniques as described in connection with FIGS. 2A-2C, testing of the web site may be centralized using the corresponding set of identifiers in the tag library, which conserves processing costs and memory as compared with sorting through event logs associated with disparate identifier formats.

As indicated above, FIGS. 2A-2C are provided as an example. Other examples may differ from what is described with regard to FIGS. 2A-2C.

Figure 3A:
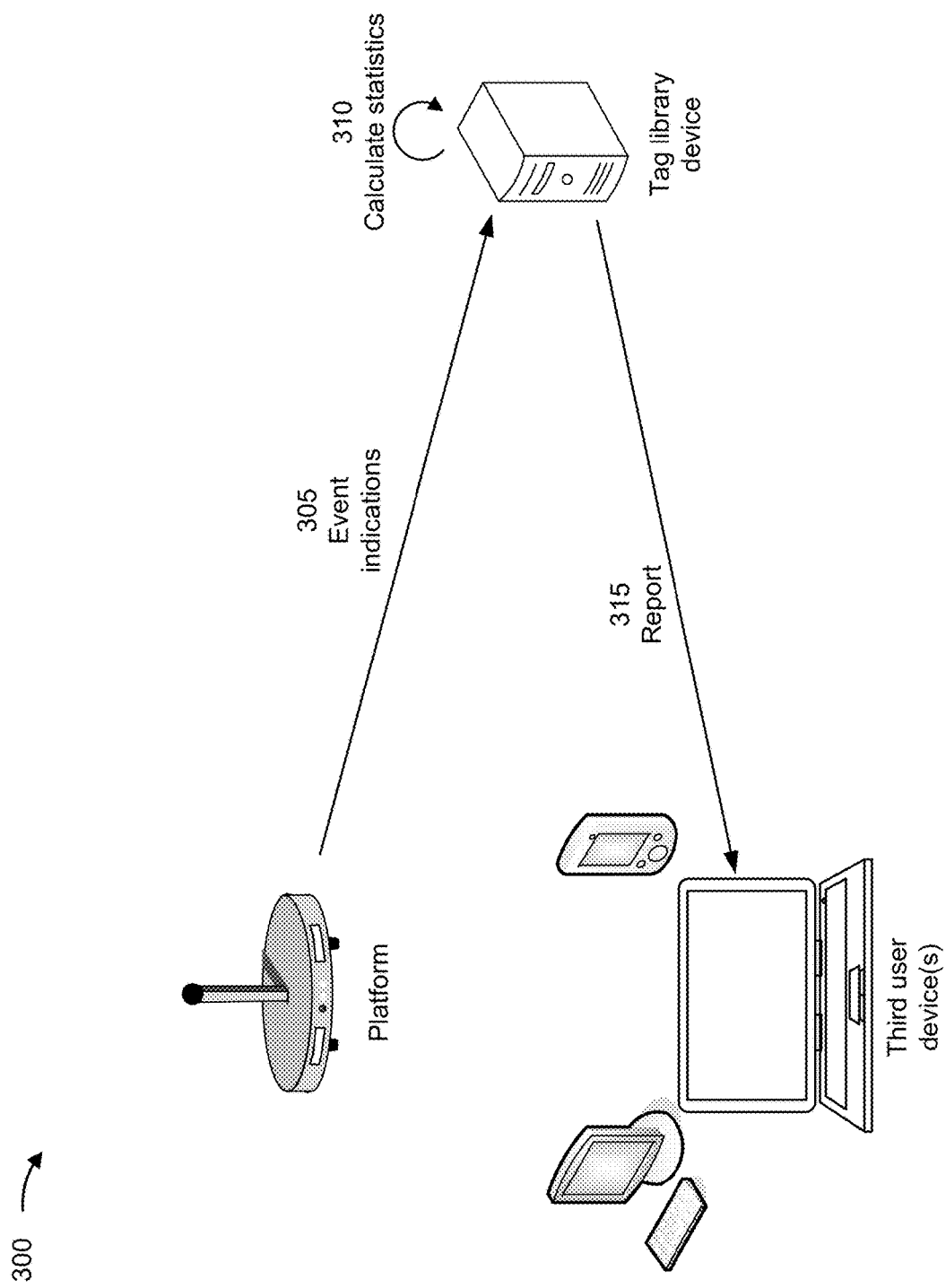
FIGS. 3A and 3B are diagrams of an example implementation relating to building and deploying a tag library for analytics, in accordance with some embodiments of the present disclosure.
Figure 3B:
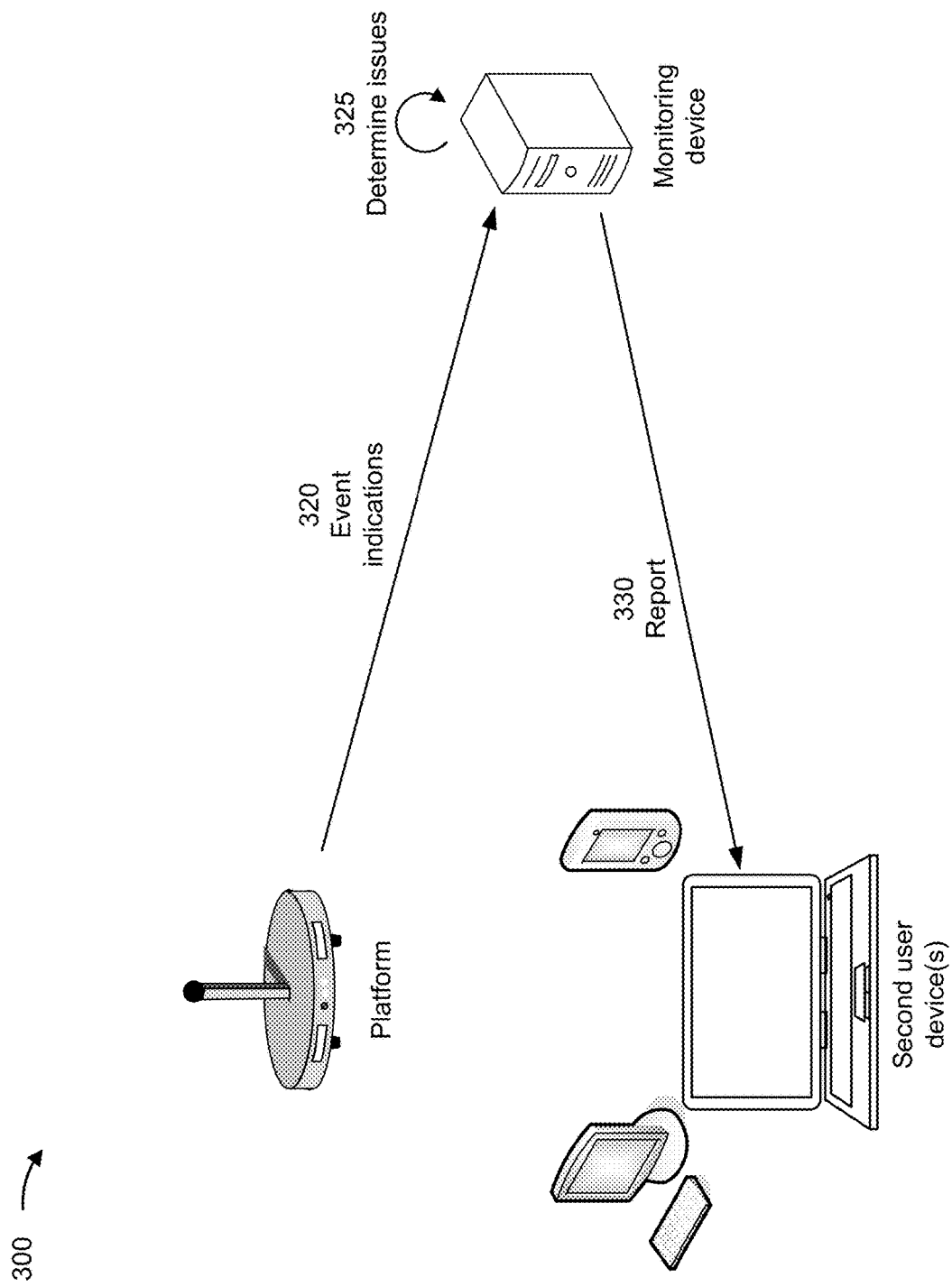

FIGS. 3A-3B are diagrams of an example 300 associated with building and deploying a tag library for analytics. As shown in FIGS. 3A-3B, example 300 includes a tag library device, a platform, one or more third user devices, a monitoring device, and one or more second user devices. These devices are described in more detail in connection with FIGS. 7 and 8.

In the example 300, the tag library device may have built a data structure as described in connection with FIG. 1A. For example, the tag library device may have crowdsourced a set of tags, with a corresponding set of rules and a corresponding set of properties, from first user device(s). Additionally, the tag library device may have generate a corresponding set of identifiers for the set of tags. Therefore, the tag library device may receive the data structure from a local storage (e.g., a memory managed by the tag library device) and/or from a storage that is at least partially external (e.g., logically, physically, and/or virtually) to the tag library device. Therefore, the tag library device may transmit a query to an external database (e.g., included in an HTTP request and/or using an API call) and receive a response to the query (e.g., included in an HTTP response and/or as a return from the API call) that includes the data structure.

As shown in FIG. 3A and by reference number 305, the platform may transmit, and the tag library device may receive, an indication of a set of events associated with a web site (that incorporates at least a portion of the set of tags). Each event may include a corresponding identifier for the tag that recorded the event along with a datetime, an IP address, a MAC address, and/or another piece of information recorded by the tag. Interaction with an element of the web site may trigger the tag to record the event based on the interaction. Accordingly, the event may further indicate a type of interaction (e.g., a mouse click, data entry via typing, or a scroll, among other examples). The indication may be included in an HTTP message and/or provided as return from an API call, among other examples.

The tag library device may collate the set of events from the platform over time. For example, the platform may stream events to the tag library device such that the indication of the set of events is compiled over time. The platform may stream in real-time (e.g., transmitting each event within one or two seconds after the event is generated by the tag) or in quasi-real-time (e.g., sending periodic batches of events to the tag library device). In some implementations, the tag library device may subscribe to event updates from the platform (e.g., using an HTTP message and/or an API call).

As shown by reference number 310, the tag library device may calculate statistics (e.g., one or more statistics) based on the set of events. The statistics may include traffic over time for each tag included in the web site. For example, a quantity of events generated by a tag may be binned (e.g., in hourly increments or in daily increments, among other examples)

such that traffic is calculated for each tag and in each bin. Additionally, or alternatively, the tag library device may calculate a rolling average of events generated by each tag over time.

The statistics may be associated with (at least) a portion of the corresponding set of identifiers for the portion of the set of tags included in the web site. Because each tag is associated with a unique identifier in the data structure, as described in connection with FIG. 1A, the tag library device may generate a single report for all tags by using the data structure as a single source of truth. For example, the data structure includes identifiers for all tags included in the web site such that the tag library device may map all events received from the platform to corresponding tags and calculate statistics accordingly. The tag library device therefore conserves power, processing resources, and memory overhead as compared with mapping events received from the platform to multiple sources of truth (e.g., using different tag identifier formats from different teams that contributed to the web site). Indeed, in some scenarios, the tag library device may have been unable to distinguish events, associated with different tags, that were associated with different tags but independently assigned a same identifier by different teams, thus reducing accuracy of the statistics.

In example 300, the tag library device may include an analytics engine that receives event information from the platform and generated by the portion of the set of tags incorporated in the web site. Other examples may include an external analytics engine that receives the event information from the platform (or from an external hosting device controlled by the platform). Accordingly, the tag library device may additionally, or alternatively, transmit the portion of the data structure to the external analytics engine.

As shown by reference number 315, the tag library device may transmit, and the third user device(s) may receive, a report including the statistics. For example, the tag library device may generate a table in a spreadsheet, a pdf file, or another type of document that indicates the statistics. In some implementations, as described in connection with FIG. 6, the report may include a graphical representation of the statistics.

The third user device(s) may be associated with analytics for the web site. Therefore, the third user device(s) may request debugging and correction from developers when the statistics are abnormal (e.g., fail to satisfy an expectation threshold and/or an expected pattern). Additionally, or alternatively, the third user device(s) may include second user device(s) such that developers are notified directly of the statistics.

In some implementations, the third user device(s) may customize the report. For example, the third user device(s) may transmit, and the tag library device may receive, a request for a particular report (e.g., a statistic associated with one tag divided or multiplied by a statistic associated with another tag, among other examples). The request may include an HTTP message and/or an API call. Therefore, the tag library device may calculate the statistics based on the request and transmit the report including the statistics to the third user device(s).

Additionally, or alternatively, the third user device(s) may instruct the tag library device to perform a join function on the data structure and a structured representation of the set of events to generate a joined data structure. Accordingly, the third user device(s) may instruct the tag library device to determine metadata on a per-tag basis (e.g., associated with at least one tag from the set of tags) based on the joined data structure. As a result, the data structure is joined to the set of events to map events uniquely to tags in the data structure, such that metadata may be extracted with less memory overhead as compared with using queries to differentiate information in the set of events. Example 300 includes the tag library device extracting the metadata, but other examples may include the third user device(s) extracting the metadata directly or may include an external data lake that receives the event information from the platform (or from an external hosting device controlled by the platform) and that extracts the metadata.

As shown in FIG. 3B and by reference number 320, the platform may transmit, and the monitoring device may receive, the indication of the set of events associated with the web site. The monitoring device may collate the set of events from the platform over time. For example, the platform may stream events to the monitoring device such that the indication of the set of events is compiled over time. The platform may stream in real-time (e.g., transmitting each event within one or two seconds after the event is generated by the tag) or in quasi-real-time (e.g., sending periodic batches of events to the monitoring device). In some implementations, the monitoring device may subscribe to event updates from the platform (e.g., using an HTTP message and/or an API call).

As shown by reference number 325, the monitoring device may determine issues (e.g., one or more issues) associated with the web site. The issues may be determined at a tag level (e.g., as described in connection with FIG. 1C) and/or at an application-level. For example, the monitoring device may estimate patterns in user behavior (e.g., by comparing clicks, taps, scrolls, typing, and/or another type of interaction, with expected interactions). The patterns may be determined based on time bins, geographic areas, and/or user device types, among other examples. Therefore, the monitoring device may detect an abnormal pattern. For example, the second user device(s) may indicate an abnormality threshold, or the monitoring device may apply an abnormality threshold that is a default, such that the abnormal pattern is detected based on a difference between user behavior and expected user behavior satisfying the abnormality threshold.

Additionally, in some implementations, the monitoring device may monitor external devices (e.g., downtime associated with the platform and/or associated APIs, among other examples). As a result, the monitoring device may determine when a back-end failure (e.g., at the platform) or an API outage, among other examples, likely resulted in the abnormal pattern, as described above. Accordingly, the monitoring device may indicate an external problem in the report, as described in connection with reference number 330, along with the abnormal pattern.

As shown by reference number 330, the tag library device may transmit, and the second user device(s) may receive, a report indicating the issues. For example, the tag library device may generate a table in a spreadsheet, a pdf file, or another type of document that includes a description of the issues.

In example 300, the monitoring device is external to the platform and to the tag library device. Other examples may include the monitoring device at least partially integrated (e.g., logically, physically, and/or virtually) with the tag library device and/or the platform.

The second user device(s) may be associated with developer accounts. For example, the second user device(s) may update code for the web site in response to the report from the monitoring device. For example, the second user device(s) may update the code based on the report indicating an abnormal pattern of user behavior. As described above, the code for the web site may include HTML, CSS, JavaScript, and/or similar code.

By using techniques as described in connection with FIGS. 3A-3B, the tag library device and/or the monitoring device determine analytics for the web site regardless of how many teams contributed tags to the web site because all events generated by the web site are identifiable using the corresponding set of identifiers in the data structure. Calculating analytics using the data structure as a single source of truth conserves power, processing resources, and memory overhead as compared with calculating analytics when each team's tags are associated with different identifier formats as compared with other teams' tags.

As indicated above, FIGS. 3A-3B are provided as an example. Other examples may differ from what is described with regard to FIGS. 3A-3B.

FIG. 4 is a diagram of an example data structure 400 used as a tag library. The example data structure 400 may be built and used by a tag library device, which is described in more detail in connection with FIGS. 7 and 8.

As shown in FIG. 4, the example data structure 400 may include, for each tag in a set of tags, identifiers 405 of a web site including the tag and of users (e.g., one or more users) that developed the tag. In FIG. 4, the web site is identified by an "Experience" and a "Product Name," and users are identified by teams (using a "Team Name") and by supervisors (using an "Experience Leader Name" and "Team Lead Name"). Other examples may include additional and/or alternative identifiers.

As further shown in FIG. 4, the example data structure 400 may include unique alphanumeric identifiers 410 for the set of tags. Additionally, the example data structure 400 may include, for each tag, properties 415 associated with the tag. In FIG. 4, the properties include a "Feature Name," a "Tag Name," a "Tag Description," a "Dynamic Indicator," an "Action" indication, and an "Element Type" associated with the tag. Other examples may include additional and/or alternative properties.

As shown in FIG. 4, the example data structure 400 may include, for each tag, rules 420 associated with the tag. In FIG. 4, the rules include an "Application Id Rule," a "Value Rule," a "Dealer Id Rule," and a "VIN Rule." Other examples may include additional and/or alternative rules.

By using techniques as described in connection with FIG. 4, the data structure may be organized by rows, where each row corresponds to a different tag in the set of tags. Using rows reduces overhead as compared with organizing by columns because rules and properties associated with each tag may be retrieved using a first index for a row corresponding to the tag. As a result, an event library may be joined to the data structure to map events uniquely to the tags in the tag library (e.g., as described in connection with FIG. 3B). Metadata may therefore be extracted from the event library on a per-tag basis with less memory overhead as compared with using queries to differentiate information in the event library.

As indicated above, FIG. 4 is provided as an example. Other examples may differ from what is described with regard to FIG. 4.

Figure 5:
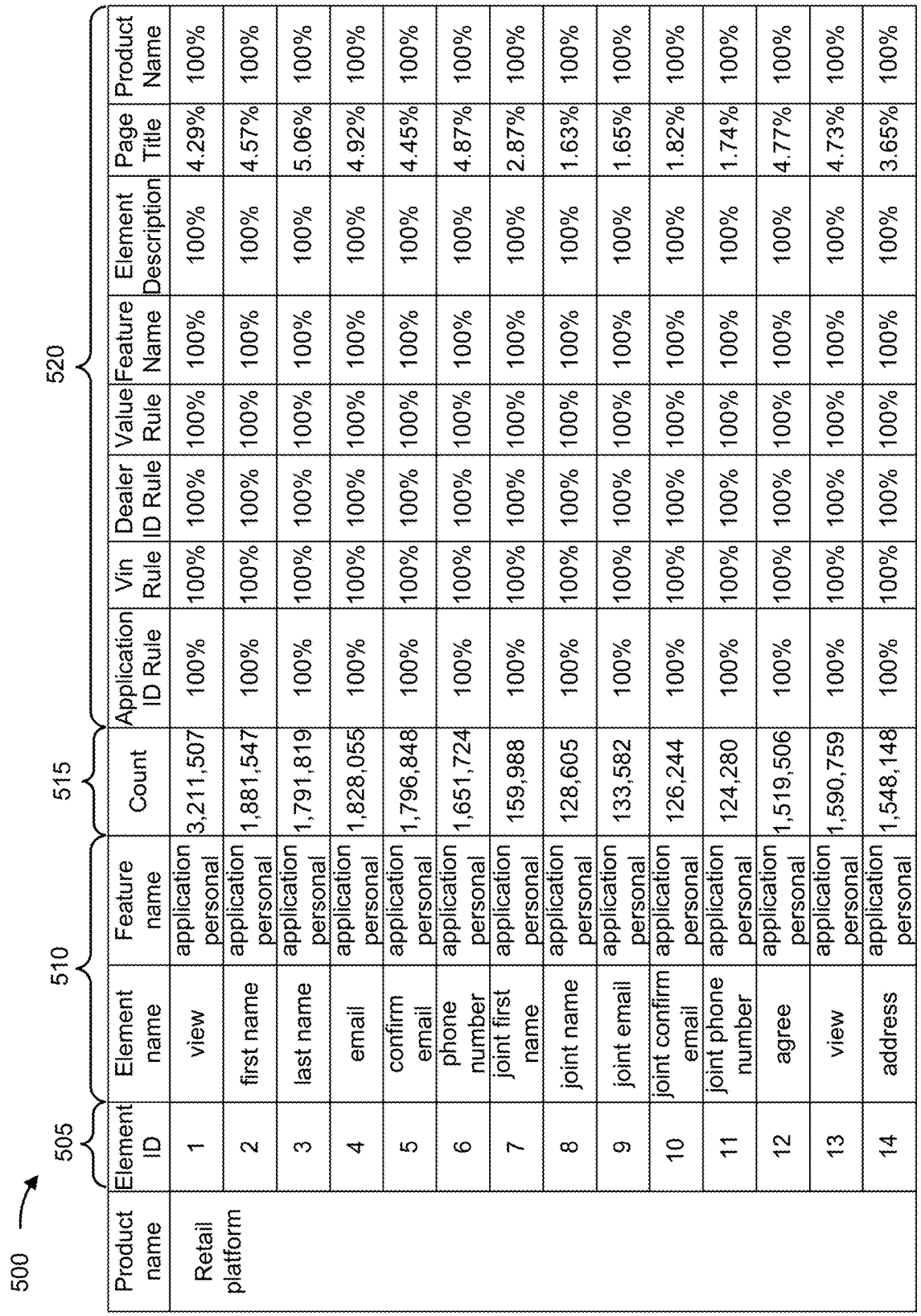
FIG. 5 is a diagram of an example tag quality report, in accordance with some embodiments of the present disclosure.

FIG. 5 is a diagram of an example tag quality report 500. The example tag quality report 500 may be generated and output by a tag library device, which is described in more detail in connection with FIGS. 7 and 8.

As shown in FIG. 5, the example tag quality report 500 may include unique alphanumeric identifiers 505 for a set of tags. Additionally, the example tag quality report 500 may include, for each tag in the set of tags, properties 510 associated with the tag. In FIG. 5, the properties include an "Element Name" and a "Feature Name" associated with the tag. Other examples may include additional and/or alternative properties.

As further shown in FIG. 5, the example tag quality report 500 may include quantities of events 515 associated with the set of tags. Additionally, the example tag quality report 500 may include, for each tag, statistics 520 associated with verification of events generated by the tag against rules associated with the tag. In FIG. 5, the rules include an "Application Id Rule," a "VIN Rule," a "Dealer Id Rule," a "Value Rule," a "Feature Name" rule, an "Element Description" rule, a "Page Title" rule, and a "Product Name" rule. Other examples may include additional and/or alternative rules.

By using techniques as described in connection with FIG. 5, a single report is generated for the set of tags as compared with generating multiple reports, such as one report per team that contributed to the set of tags.

As indicated above, FIG. 5 is provided as an example. Other examples may differ from what is described with regard to FIG. 5.

Figure 6:
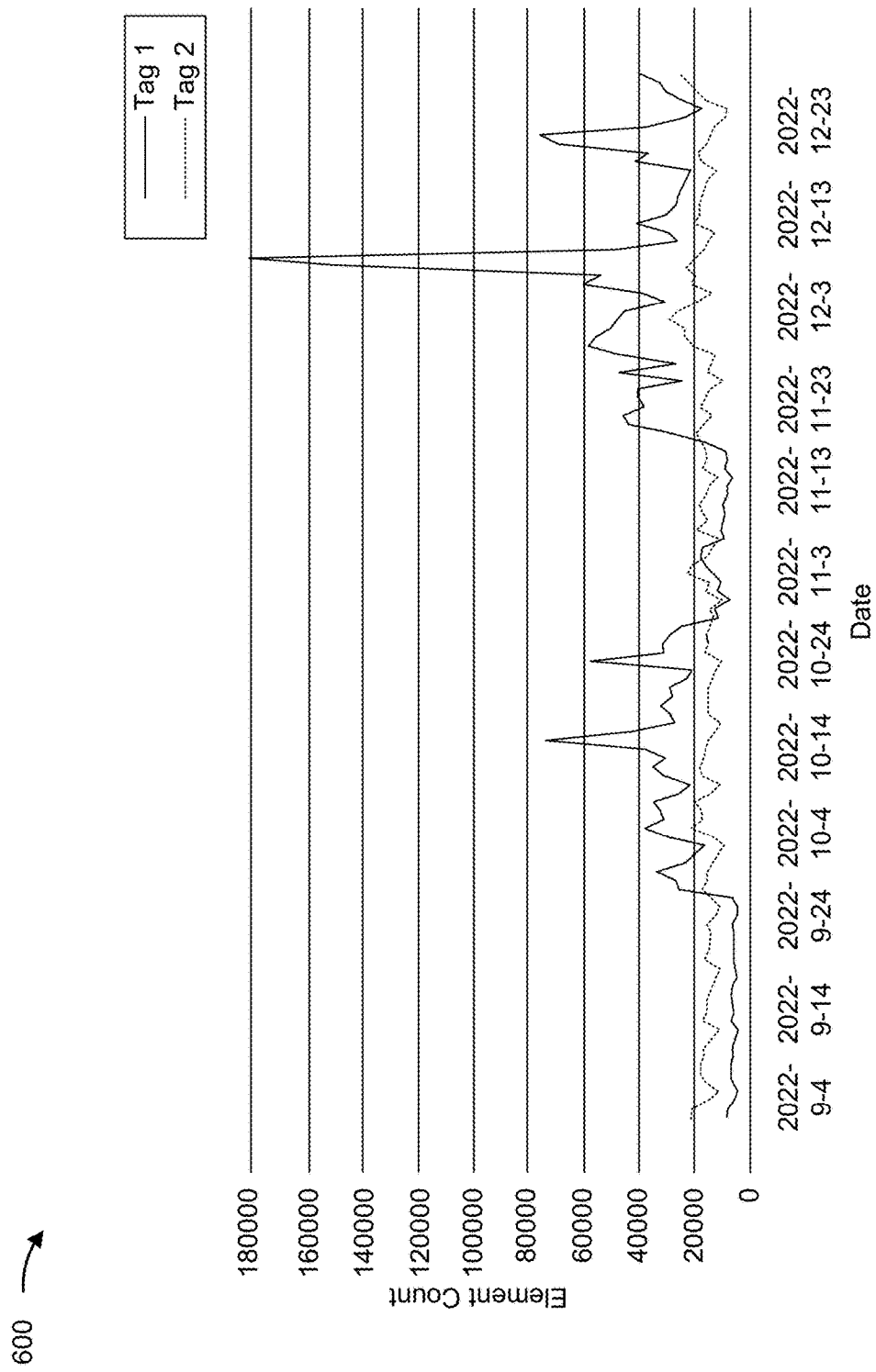
FIG. 6 is a diagram of an example traffic analytics report, in accordance with some embodiments of the present disclosure.

FIG. 6 is a diagram of an example traffic analytics report 600. The example traffic analytics report 600 may be generated and output by a tag library device, which is described in more detail in connection with FIGS. 7 and 8.

As shown in FIG. 6, the example traffic analytics report 600 may include traffic over time for each tag in a set of tags. By using techniques as described in connection with FIG. 6, a single report is generated for the set of tags as compared with generating multiple reports, such as one report per team that contributed to the set of tags.

As indicated above, FIG. 6 is provided as an example. Other examples may differ from what is described with regard to FIG. 6.

Figure 7:
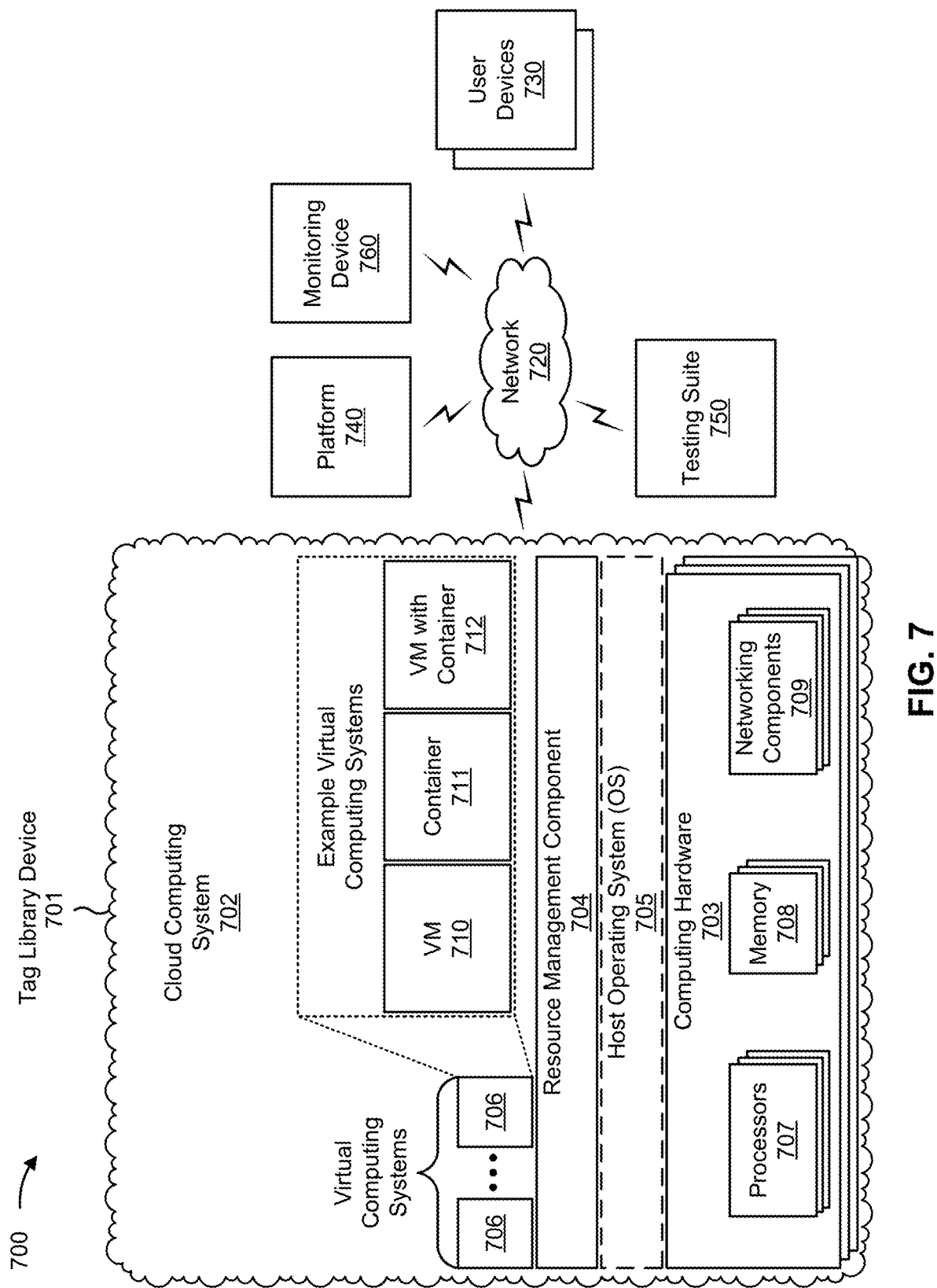
FIG. 7 is a diagram of an example environment in which systems and/or methods described herein may be implemented, in accordance with some embodiments of the present disclosure.

FIG. 7 is a diagram of an example environment 700 in which systems and/or methods described herein may be implemented. As shown in FIG. 7, environment 700 may include a tag library device 701, which may include one or more elements of and/or may execute within a cloud computing system 702. The cloud computing system 702 may include one or more elements 703-712, as described in more detail below. As further shown in FIG. 7, environment 700 may include a network 720, one or more user devices 730, a platform 740, a testing suite 750, and/or a monitoring device 760. Devices and/or elements of environment 700 may interconnect via wired connections and/or wireless connections.

The cloud computing system 702 may include computing hardware 703, a resource management component 704, a host operating system (OS) 705, and/or one or more virtual computing systems 706. The cloud computing system 702 may execute on, for example, an Amazon Web Services platform, a Microsoft Azure platform, or a Snowflake platform. The resource management component 704 may perform virtualization (e.g., abstraction) of computing hardware 703 to create the one or more virtual computing systems 706. Using virtualization, the resource management component 704 enables a single computing device (e.g., a computer or a server) to operate like multiple computing devices, such as by creating multiple isolated virtual computing systems 706 from computing hardware 703 of the single computing device. In this way, computing hardware 703 can operate more efficiently, with lower power consumption, higher reliability, higher availability, higher utilization, greater flexibility, and lower cost than using separate computing devices.

The computing hardware 703 may include hardware and corresponding resources from one or more computing devices. For example, computing hardware 703 may include hardware from a single computing device (e.g., a single server) or from multiple computing devices (e.g., multiple servers), such as multiple computing devices in one or more data centers. As shown, computing hardware 703 may include one or more processors 707, one or more memories 708, and/or one or more networking components 709. Examples of a processor, a memory, and a networking component (e.g., a communication component) are described elsewhere herein.

The resource management component 704 may include a virtualization application (e.g., executing on hardware, such as computing hardware 703) capable of virtualizing computing hardware 703 to start, stop, and/or manage one or more virtual computing systems 706. For example, the resource management component 704 may include a hypervisor (e.g., a bare-metal or Type 1 hypervisor, a hosted or Type 2 hypervisor, or another type of hypervisor) or a virtual machine monitor, such as when the virtual computing systems 706 are virtual machines 710. Additionally, or alternatively, the resource management component 704 may include a container manager, such as when the virtual computing systems 706 are containers 711. In some implementations, the resource management component 704 executes within and/or in coordination with a host operating system 705.

A virtual computing system 706 may include a virtual environment that enables cloud-based execution of operations and/or processes described herein using computing hardware 703. As shown, a virtual computing system 706 may include a virtual machine 710, a container 711, or a hybrid environment 712 that includes a virtual machine and a container, among other examples. A virtual computing system 706 may execute one or more applications using a file system that includes binary files, software libraries, and/or other resources required to execute applications on a guest operating system (e.g., within the virtual computing system 706) or the host operating system 705.

Although the tag library device 701 may include one or more elements 703-712 of the cloud computing system 702, may execute within the cloud computing system 702, and/or may be hosted within the cloud computing system 702, in some implementations, the tag library device 701 may not be cloud-based (e.g., may be implemented outside of a cloud computing system) or may be partially cloud-based. For example, the tag library device 701 may include one or more devices that are not part of the cloud computing system 702, such as device 800 of FIG. 8, which may include a stand-alone server or another type of computing device. The tag library device 701 may perform one or more operations and/or processes described in more detail elsewhere herein.

The network 720 may include one or more wired and/or wireless networks. For example, the network 720 may include a cellular network, a public land mobile network (PLMN), a local area network (LAN), a wide area network (WAN), a private network, the Internet, and/or a combination of these or other types of networks. The network 720 enables communication among the devices of the environment 700.

The user device(s) 730 may include one or more devices capable of receiving, generating, storing, processing, and/or providing information associated with tags, as described elsewhere herein. The user device(s) 730 may include a communication device and/or a computing device. For example, the user device(s) 730 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device. The administrator device described herein may be a user device.

The platform 740 may include one or more devices capable of receiving, generating, storing, processing, providing, and/or routing information associated with web sites, as described elsewhere herein. The platform 740 may include a communication device and/or a computing device. For example, the platform 740 may include a server, such as an application server, a client server, a web server, a database server, a host server, a proxy server, a virtual server (e.g., executing on computing hardware), or a server in a cloud computing system. In some implementations, the platform 740 may include computing hardware used in a cloud computing environment.

The testing suite 750 may include one or more devices capable of simulating user activity for web sites, as described elsewhere herein. The testing suite 750 may include a communication device and/or a computing device. For example, the testing suite 750 may include a server, such as an application server, a client server, a web server, a database server, a host server, a proxy server, a virtual server (e.g., executing on computing hardware), or a server in a cloud computing system. In some implementations, the testing suite 750 may include computing hardware used in a cloud computing environment.

The monitoring device 760 may include one or more devices capable of processing information associated with web sites and events, as described elsewhere herein. The monitoring device 760 may include a communication device and/or a computing device. For example, the monitoring device 760 may include a server, such as an application server, a client server, a web server, a database server, a host server, a proxy server, a virtual server (e.g., executing on computing hardware), or a server in a cloud computing system. In some implementations, the monitoring device 760 may include computing hardware used in a cloud computing environment.

The number and arrangement of devices and networks shown in FIG. 7 are provided as an example. In practice, there may be additional devices and/or networks, fewer devices and/or networks, different devices and/or networks, or differently arranged devices and/or networks than those shown in FIG. 7. Furthermore, two or more devices shown in FIG. 7 may be implemented within a single device, or a single device shown in FIG. 7 may be implemented as multiple, distributed devices. Additionally, or alternatively, a set of devices (e.g., one or more devices) of the environment 700 may perform one or more functions described as being performed by another set of devices of the environment 700.

Figure 8:
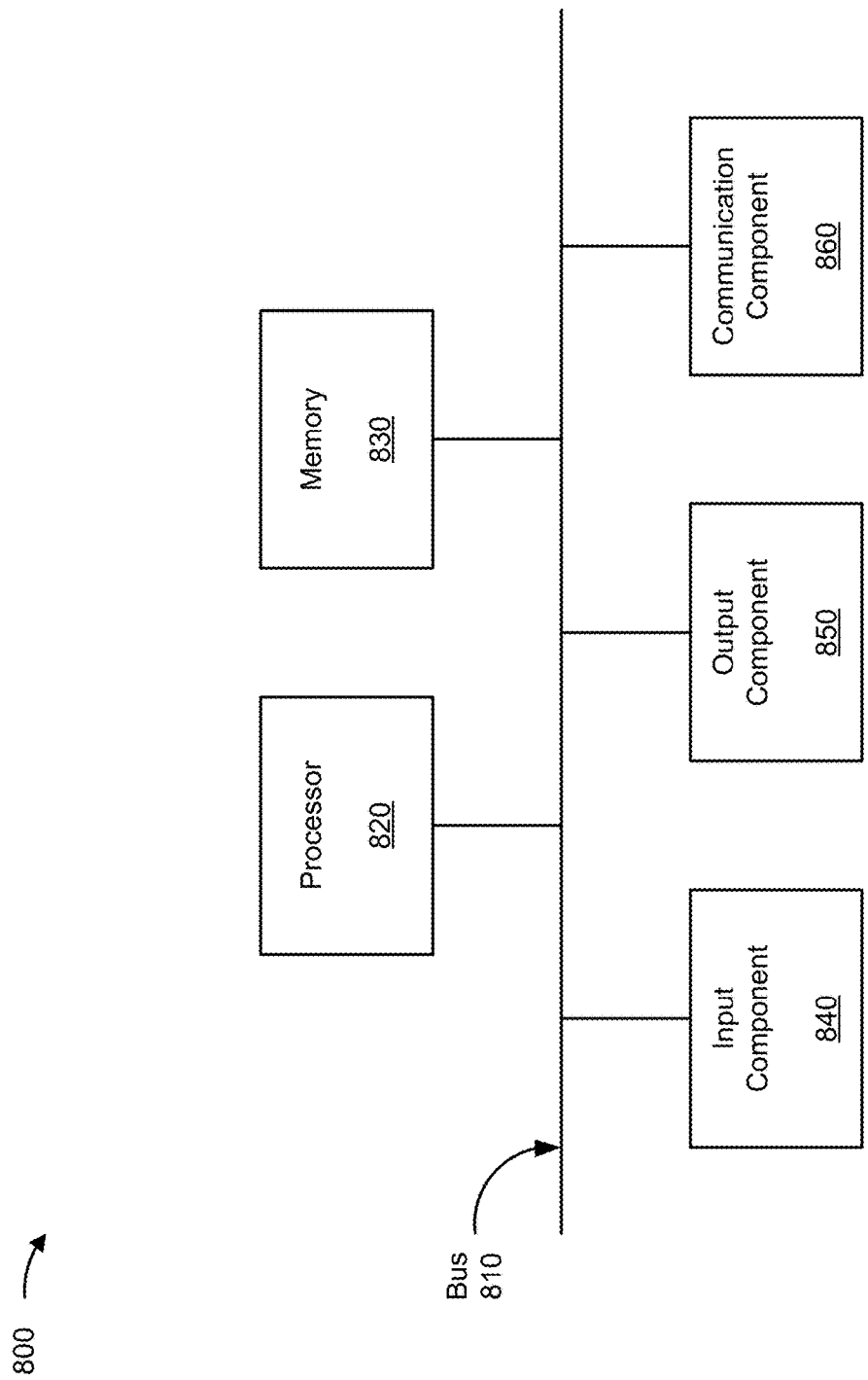
FIG. 8 is a diagram of example components of one or more devices of FIG. 7, in accordance with some embodiments of the present disclosure.

FIG. 8 is a diagram of example components of a device 800 associated with building and deploying a tag library for web site analytics and testing. The device 800 may correspond to a user device 730, a platform 740, a testing suite 750, and/or a monitoring device 760. In some implementations, the user device 730, the platform 740, the testing suite 750, and/or the monitoring device 760 may include one or more devices 800 and/or one or more components of the device 800. As shown in FIG. 8, the device 800 may include a bus 810, a processor 820, a memory 830, an input component 840, an output component 850, and/or a communication component 860.

The bus 810 may include one or more components that enable wired and/or wireless communication among the components of the device 800. The bus 810 may couple together two or more components of FIG. 8, such as via operative coupling, communicative coupling, electronic coupling, and/or electric coupling. For example, the bus 810 may include an electrical connection (e.g., a wire, a trace, and/or a lead) and/or a wireless bus. The processor 820 may include a central processing unit, a graphics processing unit, a microprocessor, a controller, a microcontroller, a digital signal processor, a field-programmable gate array, an application-specific integrated circuit, and/or another type of processing component. The processor 820 may be implemented in hardware, firmware, or a combination of hardware and software. In some implementations, the processor 820 may include one or more processors capable of being programmed to perform one or more operations or processes described elsewhere herein.

The memory 830 may include volatile and/or nonvolatile memory. For example, the memory 830 may include random access memory (RAM), read only memory (ROM), a hard disk drive, and/or another type of memory (e.g., a flash memory, a magnetic memory, and/or an optical memory). The memory 830 may include internal memory (e.g., RAM, ROM, or a hard disk drive) and/or removable memory (e.g., removable via a universal serial bus connection). The memory 830 may be a non-transitory computer-readable medium. The memory 830 may store information, one or more instructions, and/or software (e.g., one or more software applications) related to the operation of the device 800. In some implementations, the memory 830 may include one or more memories that are coupled (e.g., communicatively coupled) to one or more processors (e.g., processor 820), such as via the bus 810. Communicative coupling between a processor 820 and a memory 830 may enable the processor 820 to read and/or process information stored in the memory 830 and/or to store information in the memory 830.

The input component 840 may enable the device 800 to receive input, such as user input and/or sensed input. For example, the input component 840 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 850 may enable the device 800 to provide output, such as via a display, a speaker, and/or a light-emitting diode. The communication component 860 may enable the device 800 to communicate with other devices via a wired connection and/or a wireless connection. For example, the communication component 860 may include a receiver, a transmitter, a transceiver, a modem, a network interface card, and/or an antenna.

The device 800 may perform one or more operations or processes described herein. For example, a non-transitory computer-readable medium (e.g., memory 830) may store a set of instructions (e.g., one or more instructions or code) for execution by the processor 820. The processor 820 may execute the set of instructions to perform one or more operations or processes described herein. In some implementations, execution of the set of instructions, by one or more processors 820, causes the one or more processors 820 and/or the device 800 to perform one or more operations or processes described herein. In some implementations, hardwired circuitry may be used instead of or in combination with the instructions to perform one or more operations or processes described herein. Additionally, or alternatively, the processor 820 may be configured to perform one or more operations or processes described herein. Thus, implementations described herein are not limited to any specific combination of hardware circuitry and software.

The number and arrangement of components shown in FIG. 8 are provided as an example. The device 800 may include additional components, fewer components, different components, or differently arranged components than those shown in FIG. 8. Additionally, or alternatively, a set of components (e.g., one or more components) of the device 800 may perform one or more functions described as being performed by another set of components of the device 800.

Figure 9:
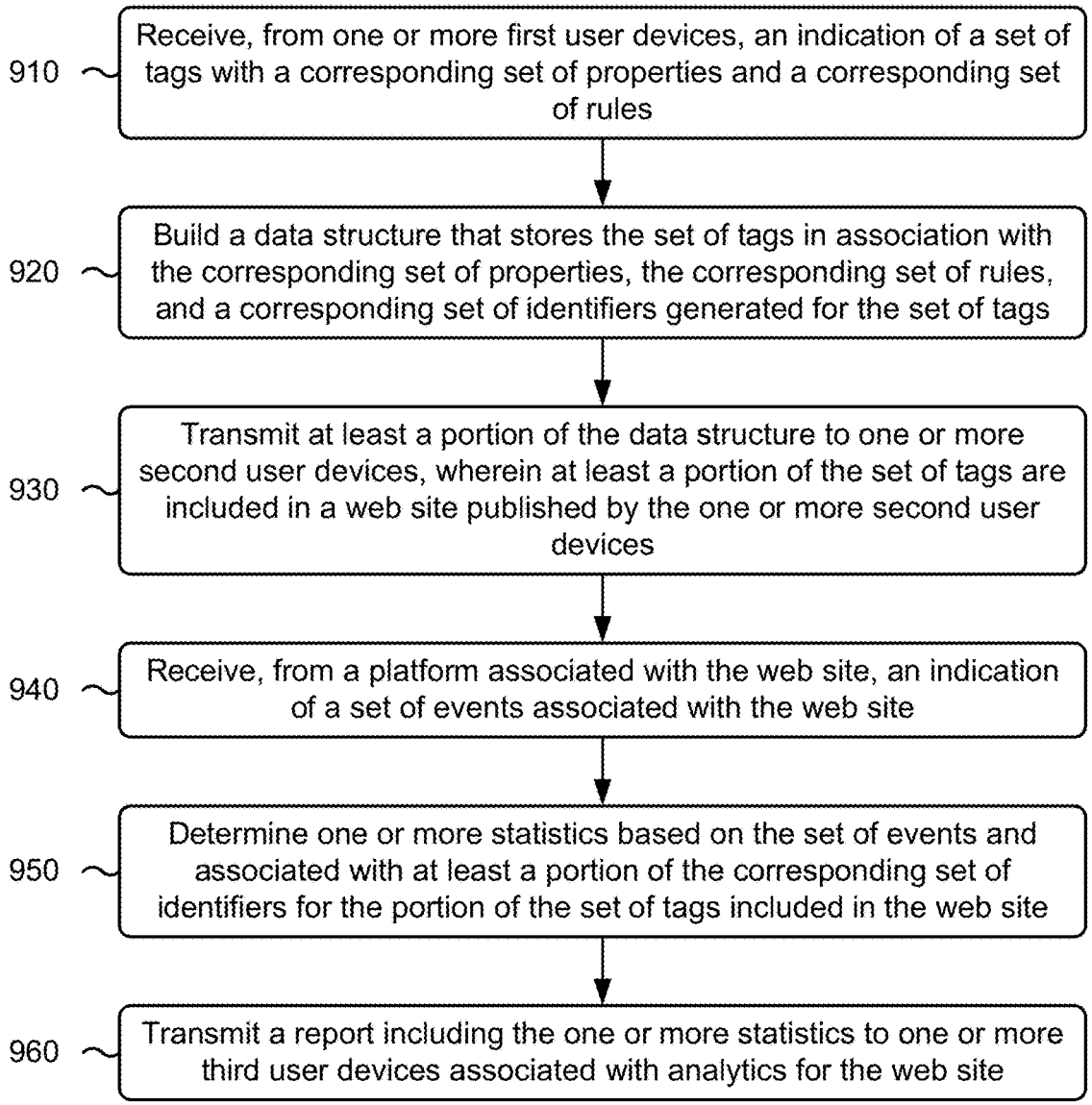
FIG. 9 is a flowchart of an example process relating to building and deploying a tag library for web site analytics, in accordance with some embodiments of the present disclosure.

FIG. 9 is a flowchart of an example process 900 associated with building and deploying a tag library for web site analytics. In some implementations, one or more process blocks of FIG. 9 may be performed by the tag library device 701. In some implementations, one or more process blocks of FIG. 9 may be performed by another device or a group of devices separate from or including the tag library device 701, such as the user device 730, the platform 740, the testing suite 750, and/or the monitoring device 760. Additionally, or alternatively, one or more process blocks of FIG. 9 may be performed by one or more components of the device 800, such as processor 820, memory 830, input component 840, output component 850, and/or communication component 860.

As shown in FIG. 9, process 900 may include receiving, from one or more first user devices, an indication of a set of tags with a corresponding set of properties and a corresponding set of rules (block 910). For example, the tag library device 701 (e.g., using processor 820, memory 830, input component 840, and/or communication component 860) may receive, from one or more first user devices, an indication of a set of tags with a corresponding set of properties and a corresponding set of rules, as described above in connection with reference number 105 of FIG. 1A. As an example, one or more users may interact with a UI (e.g., via a keyboard, a mouse, a touchscreen, or another type of input component) and trigger the first user device(s) to transmit the indication of the set of tags based on the interaction. For example, the user(s) may instruct the first user device(s) to navigate to a web site (e.g., via a web browser or another type of application) that is hosted by, or at least associated with, the tag library device 701, such that the user(s) interact with the website (e.g., via a keyboard, a mouse, a touchscreen, or another type of input component) to trigger the first user device(s) to transmit the indication of the set of tags.

As further shown in FIG. 9, process 900 may include building a data structure that stores the set of tags in association with the corresponding set of properties, the corresponding set of rules, and a corresponding set of identifiers generated for the set of tags (block 920). For example, the tag library device 701 (e.g., using processor 820 and/or memory 830) may build a data structure that stores the set of tags in association with the corresponding set of properties, the corresponding set of rules, and a corresponding set of identifiers generated for the set of tags, as described above in connection with reference number 115 of FIG. 1A. As an example, the data structure may include a tabular database or another type of relational database. In some implementations, the tag library device 701 may generate the corresponding set of identifiers by generating, for each tag in the set of tags, a unique alphanumeric identifier for including in the corresponding set of identifiers.

As further shown in FIG. 9, process 900 may include transmitting at least a portion of the data structure to one or more second user devices, wherein at least a portion of the set of tags are included in a web site published by the one or more second user devices (block 930). For example, the tag library device 701 (e.g., using processor 820, memory 830, and/or communication component 860) may transmit at least a portion of the data structure to one or more second user devices, wherein at least a portion of the set of tags are included in a web site published by the one or more second user devices, as described above in connection with reference number 120 of FIG. 1B. As an example, the tag library device 701 may transmit the portion of the data structure in response to a request. One or more users may interact with a UI (e.g., via a keyboard, a mouse, a touchscreen, or another type of input component) and trigger the second user device(s) to transmit the request based on the interaction. For example, the user(s) may instruct the second user device(s) to navigate to a web site (e.g., via a web browser or another type of application) that is hosted by, or at least associated with, the tag library device 701, such that the user(s) interact with the website (e.g., via a keyboard, a mouse, a touchscreen, or another type of input component) to trigger the second user device(s) to transmit the request.

As further shown in FIG. 9, process 900 may include receiving, from a platform associated with the web site, an indication of a set of events associated with the web site (block 940). For example, the tag library device 701 (e.g., using processor 820, memory 830, input component 840, and/or communication component 860) may receive, from a platform associated with the web site, an indication of a set of events associated with the web site, as described above in connection with reference number 305 of FIG. 3A. As an example, the tag library device 701 may collate the set of events from the platform over time. The platform may stream events to the tag library device 701 such that the indication of the set of events is compiled over time.

As further shown in FIG. 9, process 900 may include determining one or more statistics based on the set of events and associated with at least a portion of the corresponding set of identifiers for the portion of the set of tags included in the web site (block 950). For example, the tag library device 701 (e.g., using processor 820 and/or memory 830) may determine one or more statistics based on the set of events and associated with at least a portion of the corresponding set of identifiers for the portion of the set of tags included in the web site, as described above in connection with reference number 310 of FIG. 3A. As an example, the tag library device 701 may bin a quantity of events generated by a tag (e.g., in hourly increments or in daily increments, among other examples) such that traffic is calculated for each tag and in each bin. Additionally, or alternatively, the tag library device 701 may calculate a rolling average of events generated by each tag over time.

As further shown in FIG. 9, process 900 may include transmitting a report including the one or more statistics to one or more third user devices associated with analytics for the web site (block 960). For example, the tag library device 701 (e.g., using processor 820, memory 830, and/or communication component 860) may transmit a report including the one or more statistics to one or more third user devices associated with analytics for the web site, as described above in connection with reference number 315 of FIG. 3A. As an example, the tag library device may generate a table in a spreadsheet, a pdf file, or another type of document that indicates the one or more statistics. In some implementations, as described in connection with FIG. 6, the report may include a graphical representation of the one or more statistics.

Although FIG. 9 shows example blocks of process 900, in some implementations, process 900 may include additional blocks, fewer blocks, different blocks, or differently arranged blocks than those depicted in FIG. 9. Additionally, or alternatively, two or more of the blocks of process 900 may be performed in parallel. The process 900 is an example of one process that may be performed by one or more devices described herein. These one or more devices may perform one or more other processes based on operations described herein, such as the operations described in connection with FIGS. 1A-1C, 2A-2C, 3A-3B, and/or 4-6. Moreover, while the process 900 has been described in relation to the devices and components of the preceding figures, the process 900 can be performed using alternative, additional, or fewer devices and/or components. Thus, the process 900 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for using a tag library for determining web site quality, the system comprising:
   one or more memories; and
   one or more processors, communicatively coupled to the one or more memories, configured to:
      receive, from two or more first user devices, an indication of a set of tags with a corresponding set of properties and a corresponding set of rules,
         wherein the set of tags are associated with standardized formats, and
         wherein one of the first user devices transmits code for a first subset, of the set of tags, and another of the first user devices transmits code for a second subset, of the set of tags;
      generate a corresponding set of identifiers for the set of tags;
      build a data structure that stores the set of tags in association with the corresponding set of properties, the corresponding set of identifiers, and the corresponding set of rules;
      transmit at least a portion of the data structure to one or more second user devices, wherein at least a portion of the set of tags are included in a web site published by the one or more second user devices,
         wherein the corresponding set of identifiers provide centralized testing of the web site;
      receive, from a platform associated with the web site, an indication of a set of events associated with the web site,
         wherein an event, of the set of events, includes a piece of information recorded by a tag;
      verify the set of events against at least a portion of the corresponding set of rules for the portion of the set of tags included in the web site,
         wherein the set of the rules includes a rule associated with a quality of information; and
      transmit a report associated with verifying the set of events to one or more third user devices associated with analytics for the web site.

2. The system of claim 1, wherein the one or more processors, to generate the corresponding set of identifiers, are configured to:
   generate, for each tag in the set of tags, a unique alphanumeric identifier for including in the set of identifiers.

3. The system of claim 1, wherein the one or more processors are further configured to:
   receive, from the one or more first user devices, one or more sets of credentials; and
   verify the one or more sets of credentials,
      wherein the indication of the set of tags is received based on verifying the one or more sets of credentials.

4. The system of claim 1, wherein the report indicates a portion, of the set of events, that comply with each rule in the corresponding set of rules.

5. The system of claim 1, wherein the one or more second user devices are associated with developer accounts.

6. The system of claim 1, wherein the data structure is organized by rows, where each row corresponds to a different tag in the set of tags.

7. A method of using a tag library to enable web site reports, comprising:
   receiving, from one or more first user devices, an indication of a set of tags with a corresponding set of properties and a corresponding set of rules;
   building a data structure that stores the set of tags in association with the corresponding set of properties, the corresponding set of rules, and a corresponding set of identifiers generated for the set of tags;
   transmitting at least a portion of the data structure to one or more second user devices, wherein at least a portion of the set of tags are included in a web site published by the one or more second user devices,
      wherein the corresponding set of identifiers provide centralized testing of the web site;
   receiving, as a stream and from a platform associated with the web site, an indication of a set of events associated with the web site;
   determining one or more statistics based on the set of events and associated with at least a portion of the corresponding set of identifiers for the portion of the set of tags included in the web site,
      wherein determining the one or more statistics comprises:
         calculating the one or more statistics based on traffic over time for a tag, of the portion of the set of tags; and
   transmitting a report including the one or more statistics to one or more third user devices associated with analytics for the web site.

8. The method of claim 7, further comprising:
   transmitting, to the platform associated with the web site, the portion of the data structure,
      wherein the indication of the set of events are received based on the portion of the data structure.

9. The method of claim 7, further comprising:
   performing a join function on the data structure and a structured representation of the set of events to generate a joined data structure; and
   determining metadata associated with at least one tag, from the set of tags, based on the joined data structure.

10. The method of claim 7, wherein the report includes a graphical representation of the one or more statistics.

11. The method of claim 7, wherein the one or more third user devices are the one or more second user devices.

12. The method of claim 7, wherein the data structure is organized by rows, where each row corresponds to a different tag in the set of tags.

13. The method of claim 7, wherein the set of tags are associated with standardized formats.

14. A non-transitory computer-readable medium storing a set of instructions for using a tag library to simulate user interaction, the set of instructions comprising:
one or more instructions that, when executed by one or more processors of a device, cause the device to:
receive a data structure that stores a set of tags in association with a corresponding set of properties, a corresponding set of identifiers, and a corresponding set of rules,
wherein the set of tags are associated with standardized formats;
receive an indication of dependencies between at least a portion of the set of tags;
simulate a plurality of paths through a web site including the portion of the set of tags,
wherein the corresponding set of identifiers provide centralized testing of the web site;
receive an indication of a set of events associated with the plurality of paths,
wherein an event, of the set of events, includes a piece of information recorded by a tag;
verify the set of events against at least a portion of the corresponding set of rules for the portion of the set of tags included in the web site,
wherein the set of the rules includes a rule associated with a quality of information; and
transmit a report associated with verifying the set of events.

15. The non-transitory computer-readable medium of claim 14, wherein the one or more instructions, when executed by the one or more processors, further cause the device to:
transmit an indication of approval based on a measurement, included in the report, satisfying a threshold.

16. The non-transitory computer-readable medium of claim 14, wherein the one or more instructions, that cause the device to simulate the plurality of paths, cause the device to:
generate the plurality of paths based on the indication of dependencies and at least a portion of the corresponding set of identifiers for the portion of the set of tags included in the web site.

17. The non-transitory computer-readable medium of claim 14, wherein the one or more instructions, when executed by the one or more processors, further cause the device to:
receive files encoding the web site with the portion of the set of tags.

18. The non-transitory computer-readable medium of claim 14, wherein the one or more instructions, that cause the device to receive the data structure, cause the device to:
transmit, to a library device, a request for the data structure; and
receive, from the library device, the data structure in response to the request.

19. The non-transitory computer-readable medium of claim 14, wherein the one or more instructions, that cause the device to receive the indication of the set of events, cause the device to:
receive, as a stream, the set of events while simulating the plurality of paths.

20. The non-transitory computer-readable medium of claim 14, wherein the data structure is organized by rows, where each row corresponds to a different tag in the set of tags.

* * * * *